US009700064B2

(12) United States Patent
Miladinov et al.

(10) Patent No.: US 9,700,064 B2
(45) Date of Patent: *Jul. 11, 2017

(54) NON-CHEWING GUM CONFECTIONERY COMPOSITION

(75) Inventors: Vesselin D. Miladinov, Denville, NJ (US); Cesar Carlos Elejalde, Randolph, NJ (US); Jesse Kiefer, Oxford, NJ (US); Bharat Jani, East Brunswick, NJ (US); Kishor Kabse, Morris Plains, NJ (US); Matthew Allan Beam, Califon, NJ (US); Allen Aldridge, South Orange, NJ (US); Jianping Chao, Summit, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/624,436

(22) Filed: Nov. 24, 2009

(65) Prior Publication Data

US 2010/0136184 A1    Jun. 3, 2010

Related U.S. Application Data

(60) Provisional application No. 61/200,403, filed on Nov. 28, 2008, provisional application No. 61/208,926, filed on Mar. 2, 2009, provisional application No. 61/268,242, filed on Jun. 11, 2009, provisional application No. 61/269,328, filed on Jun. 23, 2009, provisional application No. 61/247,997, filed on Oct. 2, 2009.

(51) Int. Cl.
| | |
|---|---|
| A23G 4/20 | (2006.01) |
| A23G 3/34 | (2006.01) |
| A23G 3/20 | (2006.01) |
| A23G 3/54 | (2006.01) |
| A23G 4/04 | (2006.01) |

(52) U.S. Cl.
CPC ............ *A23G 4/20* (2013.01); *A23G 3/0068* (2013.01); *A23G 3/2015* (2013.01); *A23G 3/54* (2013.01); *A23G 4/043* (2013.01); *A23G 4/046* (2013.01)

(58) Field of Classification Search
CPC .................................. A23G 3/54; A23G 4/20
See application file for complete search history.

(56) References Cited

U.S. PATENT DOCUMENTS

| | | | |
|---|---|---|---|
| 2,507,477 A | 5/1950 | McDonald et al. | |
| 3,384,498 A | 5/1968 | Ahrabi | |
| 3,765,918 A | 10/1973 | Jordan et al. | |
| 4,032,661 A | 6/1977 | Rowsell et al. | |
| 4,105,461 A | 8/1978 | Racciato | |
| 4,136,163 A | 1/1979 | Watson et al. | |
| 4,217,368 A * | 8/1980 | Witzel et al. | 426/5 |
| 4,229,484 A | 10/1980 | Steels et al. | |
| 4,230,688 A | 10/1980 | Rowsell et al. | |
| 4,238,510 A | 12/1980 | Cherukuri et al. | |
| 4,250,196 A * | 2/1981 | Friello | 426/5 |
| 4,299,825 A | 11/1981 | Lee | |
| 4,352,825 A | 10/1982 | Cherukuri et al. | |
| 4,431,678 A | 2/1984 | Sollich | |
| 4,454,834 A | 6/1984 | Haas et al. | |
| 4,459,425 A | 7/1984 | Amano et al. | |
| 4,466,983 A | 8/1984 | Cifrese et al. | |
| 4,497,846 A | 2/1985 | Boursier et al. | |
| 4,519,844 A | 5/1985 | Chau et al. | |
| 4,524,086 A | 6/1985 | Player et al. | |
| 4,557,938 A | 12/1985 | Sander et al. | |
| 4,656,039 A | 4/1987 | Weiss et al. | |
| 4,693,888 A | 9/1987 | Miyahara et al. | |
| 4,728,515 A | 3/1988 | Patel et al. | |
| 4,747,881 A | 5/1988 | Shaw et al. | |
| 4,753,790 A | 6/1988 | Silva et al. | |
| 4,911,937 A | 3/1990 | Crosello et al. | |
| 5,009,916 A | 4/1991 | Colliopoulos | |
| 5,171,589 A | 12/1992 | Richey | |
| 5,266,592 A | 11/1993 | Grub et al. | |
| 5,286,502 A | 2/1994 | Meyers | |
| 5,300,305 A | 4/1994 | Stapler et al. | |
| 5,344,664 A | 9/1994 | Fitch et al. | |
| 5,384,144 A | 1/1995 | Bedard et al. | |
| 5,409,715 A | 4/1995 | Meyers | |
| 5,433,960 A | 7/1995 | Meyers | |
| 5,437,879 A | 8/1995 | Kabse et al. | |

(Continued)

FOREIGN PATENT DOCUMENTS

| | | |
|---|---|---|
| GB | 639695 | 7/1950 |
| GB | 831028 | 3/1960 |

(Continued)

OTHER PUBLICATIONS

International Search Report for International Application No. PCT/US2011/038783, International Filing Date Jun. 1, 2011, Date of Mailing Feb. 6, 2012, 5 pages.
Written Opinion of the International Searching Authority for International Application No. PCT/US2011/038738, International Filing Date Jun. 1, 2011, Date of Mailing Feb. 6, 2012, 7 pages.
The International Searching Authority, International Search Report, PCT/IB2009/007718, Mailing date: May 21, 2010, 6 pages.
The International Searching Authority, Written Opinion, PCT/IB2009/007718, Mailing date: May 21, 2010, 4 pages.
PCT/US2009/065594 International Search Report, date of mailing Sep. 22, 2011, 6 pages.
PCT/US2009/065594 Written Opinion, date of mailing Sep. 22, 2011, 7 pages.
PCT/US2011/038747 International Search Report, notification date Sep. 6, 2011, 5 pages.

(Continued)

*Primary Examiner* — Jenna A Watts
(74) *Attorney, Agent, or Firm* — Cantor Colburn LLP

(57) ABSTRACT

A dough-like confectionery material contains a solid particulate, a liquid, and a diffusion controller. The dough-like confectionery material is an effective replacement for panned coatings, and it can be applied to an edible substrate, such as candy or chewing gum to form a layered confection. Methods and apparatus for forming layered confections are also described.

27 Claims, 7 Drawing Sheets

(56) References Cited

U.S. PATENT DOCUMENTS

| | | | |
|---|---|---|---|
| 5,478,593 A | 12/1995 | Serpelloni et al. | |
| 5,547,689 A * | 8/1996 | Ribadeau-Dumas et al. | 426/3 |
| 5,629,042 A | 5/1997 | Serpelloni et al. | |
| 5,665,406 A | 9/1997 | Reed et al. | |
| 5,879,728 A | 3/1999 | Graff et al. | |
| 5,955,123 A | 9/1999 | Daggy | |
| 6,221,421 B1 | 4/2001 | Wullschleger et al. | |
| 6,444,240 B1 | 9/2002 | Barkalow et al. | |
| 6,627,233 B1 | 9/2003 | Wolf et al. | |
| 6,780,443 B1 | 8/2004 | Nakatsu et al. | |
| 7,030,273 B1 | 4/2006 | Sun | |
| 7,300,679 B1 | 11/2007 | Robinson et al. | |
| 7,438,942 B2 | 10/2008 | Ortiz De Zaratte et al. | |
| 7,442,026 B2 | 10/2008 | Shulski et al. | |
| 2002/0028276 A1 | 3/2002 | Rapp et al. | |
| 2003/0099741 A1 | 5/2003 | Gubler | |
| 2003/0124228 A1 | 7/2003 | Goto et al. | |
| 2003/0157213 A1 | 8/2003 | Jenkins | |
| 2003/0190397 A1 | 10/2003 | Serpelloni | |
| 2003/0206993 A1 | 11/2003 | Gubler | |
| 2003/0215417 A1 | 11/2003 | Uchiyama et al. | |
| 2004/0081713 A1 | 4/2004 | Maxwell et al. | |
| 2004/0234648 A1 | 11/2004 | Mazurek et al. | |
| 2005/0202118 A1 | 9/2005 | Johnson et al. | |
| 2006/0024425 A1 | 2/2006 | Barkalow et al. | |
| 2006/0034975 A1 | 2/2006 | Schechner et al. | |
| 2006/0039872 A1 | 2/2006 | Schmidt | |
| 2006/0045934 A1 | 3/2006 | Kabse et al. | |
| 2006/0280834 A1 | 12/2006 | Jani et al. | |
| 2007/0065557 A1 * | 3/2007 | Pandey et al. | 426/572 |
| 2007/0082026 A1 | 4/2007 | Aimutis | |
| 2007/0148284 A1 | 6/2007 | Jani et al. | |
| 2007/0218165 A1 | 9/2007 | Castro et al. | |
| 2007/0269577 A1 | 11/2007 | Pershad et al. | |
| 2008/0014302 A1 | 1/2008 | Elejalde et al. | |
| 2008/0057155 A1 | 3/2008 | Luo et al. | |
| 2008/0063748 A1 * | 3/2008 | Massey et al. | 426/6 |
| 2008/0085354 A1 | 4/2008 | Paeschke et al. | |
| 2008/0095899 A1 | 4/2008 | Fornaguera | |
| 2008/0166449 A1 | 7/2008 | Kabse et al. | |
| 2008/0199564 A1 | 8/2008 | Boghani et al. | |
| 2009/0214719 A1 | 8/2009 | Gouin et al. | |
| 2010/0136165 A1 | 6/2010 | Miladinov et al. | |

FOREIGN PATENT DOCUMENTS

| | | |
|---|---|---|
| GB | 2053651 A | 3/1960 |
| GB | 2034572 | 6/1980 |
| GB | 2120517 A | 12/1983 |
| JP | 07067554 A | 3/1995 |
| JP | 2000166477 A | 6/2000 |
| JP | 2002017266 A | 1/2002 |
| JP | 20006204185 A | 8/2006 |
| JP | 2006280216 A1 | 10/2006 |
| JP | 2007028951 A | 2/2007 |
| JP | 2007029018 A | 2/2007 |
| JP | 2008539804 A | 11/2008 |
| WO | 0215708 A2 | 2/2002 |
| WO | 0217851 A2 | 3/2002 |
| WO | 2004073691 A1 | 9/2004 |
| WO | 2007/076170 A2 | 7/2007 |
| WO | 2007109718 | 9/2007 |
| WO | 2008030247 A2 | 3/2008 |
| WO | 2008030274 A1 | 3/2008 |
| WO | 2008045259 A2 | 4/2008 |
| WO | 2008105908 A1 | 9/2008 |
| WO | 2009036954 A1 | 3/2009 |
| WO | 2009070570 A1 | 6/2009 |
| WO | 2009108769 A2 | 9/2009 |
| WO | 2009/135100 A1 | 11/2009 |
| WO | 2009140351 A2 | 11/2009 |
| WO | 2010/062867 A2 | 6/2010 |
| WO | 2011137329 A2 | 11/2011 |
| WO | 2011153229 A1 | 12/2011 |

OTHER PUBLICATIONS

PCT/US2011/038747 Written Opinion, notification date Sep. 6, 2011, 7 pages.
JP6046760 A, Feb. 22, 1994, Abstract Only, 2 pages.
JP2000166477 A, Jun. 20, 2000, Abstract Only, 1 page.
JP2007028951 A, Feb. 8, 2007, Abstract Only, 1 page.
JP2008539804, Nov. 20, 2008, Abstract Only, 1 page.
JP6189689 A, Jul. 12, 1994, Abstract Only, 1 page.
JP7233046 A, Sep. 5, 1995, Abstract Only, 1 page.
Walter, Robert D.; "Panning—the Specialists's Specialty"; Part 1 of 2; Candy & Snack Industry; 139(1712); pp. 43, 44, 47, 48, 50 & 51; (1974).
Walter, Robert D.; "Panning—the Specialist's Specialty"; Part 2 of 2; Candy & Snack Industry; 140(1); pp. 44-51; (1975).
Japan Office Action for Japanese Patent Application No. 2013-256761, OA transmission date Mar. 10, 2015, 3 pages, English Translation.
Japan Office Action for Japanese Patent Application No. 2013-256761, OA transmission date Mar. 10, 2015, 3 pages, non-English Translation.
U.S. Non-Final Office Action for U.S. Appl. No. 12/624,440, filed Nov. 24, 2009; Notification date Mar. 2, 2015; 39 pages.
Japan Office Action for Japanese Patent Application No. 2011-538074, OA Transmission date Apr. 7, 2015, 4 pages, non-English Translation.
Japan Office Action for Japanese Patent Application No. 2011-538074, OA Transmission date Apr. 7, 2015, 5 pages, English Translation.
Robert Boutin et al., Sugarless Hard Panning, The Manufacturing Confectioner, pp. 35-42, Nov. 2004.
I.W. Cottrell et al., in R.I. Davison, Ed., "Handbook of Water Soluble Gums and Resins", McGraw-Hill, 1980, pp. 21-1 to 24-31.
EP1514483 A1, Publication date: Mar. 16, 2005, Abstract, 1 page.
John Flanyak, Panning Technology, An Overview, The Manufacturing Confectioner, pp. 65-74, Jan. 1998.
Richard W. Hartel, Crystallization and Drying During Hard Panning, The Manufacturing Confectioner, pp. 51-57, Feb. 1995.
E.B. Jackson, Ed., "Sugar Confectionery Manufacture", New York: Van Nostrand Reinhold, pp. 14 and 17-33 (1990).
JP 2002045117 A, Publication date: Feb. 12, 2002, Abstract, 1 page.
JP2004321096A, Publication date: Nov. 18, 2004, Abstract, 1 page.
Michael J. Lynch, Soft Panning, The Manufacturing Confectioner, pp. 47-50, Nov. 1987.
National Academy of Sciences, Chemicals used in food processing, publication 1274, pp. 63-258.
W. Raleigh, "HSH as a Bulking Agent in Confections", The Manufacturing Confectioner, Nov. 1995, pp. 57-59.
The International Searching Authority, International Search Report, PCT/US2009/065594, Date of mailing: Mar. 30, 2010, 4 pages.
Robert D. Walter, Panning—the specialist's specialty, Dec. 1974, Candy & Snack Industry, pp. 43-51, Dec. 1974.
Supervising Editor Aya Kagawa, "Fourth Standard Tables of Food Composition in Japan", First Edition, Kagawa Education Institute of Nutrition, Publishing Department, (1994), p. 72-73.

\* cited by examiner

NON-CHEWING GUM CONFECTIONERY COMPOSITION

CROSS REFERENCE TO RELATED APPLICATIONS

This application claims the benefit of U.S. Provisional Patent Application Ser. Nos. 61/200,403, filed Nov. 28, 2008; 61/208,926, filed Mar. 2, 2009; 61/268,242, filed Jun. 11, 2009; 61/269,328, filed Jun. 23, 2009; and 61/247,997 filed Oct. 2, 2009. Each of these applications is fully incorporated herein by reference.

FIELD OF THE INVENTION

The present invention is directed to compositions, methods, and apparatus for forming a confectionery-material-containing edible product including confectionery such as chewing gum compositions and non-chewing gum compositions. The present invention eliminates the need for a large number of coating and drying operations to form the product. Intermediate and final products produced by the compositions, methods, and apparatus described herein are also part of the present invention.

BACKGROUND OF THE INVENTION

Confectionery products, including chewing gum products, having a core covered by a layer have achieved significant market success. Consumers value the feel and appearance of a hard coated chewable product, which may, depending on the manner in which it is made, produce a desirable crunchy sensation when chewed. Commercial chewing gum products of this type include Chiclets®, Dentyne® and Eclipse®. Such hard coated products include chewing gums, lozenges, tablet-type confections, and the like.

The production of hard coated crunchy confectionery products has become standardized over the years. One common mode of production is a conventional hard panning procedure. The hard coating is generally built up around an edible core by a repetitive process of spraying a coating material on the core in a rotating drum, followed by drying at elevated temperatures. The coated product is then placed in a conditioning facility where latent moisture evaporates under room temperature, low humidity conditions. In order to achieve the desirable crunchy hard coating, many layers of the coating material (e.g., 40-60 layers) must be applied. A multilayered coated product produced in this manner is shown in the photomicrograph identified herein as FIG. 1.

The coating material used to produce hard pan crunchy coatings is typically a saturated solution of a bulk sweetener, often referred to as "a sugar syrup." The sugar syrup is a saturated solution of the coating material so that upon loss of water, the coating material, particularly the bulk sweetener, crystallizes to form a hard, crunchy layer.

The application of a single thin layer of coating material, and its subsequent drying to form a thin crystallized layer of the coating material is typically performed in 7 to 8 minutes to allow crystallization to become complete and to form a smooth, crunchy coating layer.

It is often necessary to apply 40 to 60 thin individual layers of the coating material to the core in order to provide a commercially acceptable hard crunchy coating, as observed in FIG. 1. With an average cycle time of 7 to 8 minutes, the coating process often takes six hours or more to complete.

There is, therefore, a need in the art of producing confectionery products, including chewing gums, to provide a product in less time without sacrificing the desirable qualities of the product.

The present invention departs from the conventional wisdom of applying numerous thin layers by employing a layering material that is not a traditional "sugar syrup". In particular, a dough-like confectionery material is used in which a solid particulate in the form of granules, powders, aggregates, crystals, non-crystalline solids, and mixtures thereof (e.g., sugar or sugar alcohol) is surrounded by a liquid phase and is not dissolved in a relatively large amount of liquid (e.g. water) to form a saturated solution. The present invention provides an alternative to the use of high water content solutions for producing coating materials capable of being processed into confectionery products including those having crunch characteristics. Instead, the present invention employs a layering material in the form of a dough-like confectionery material, as hereinafter defined having a low water content. The liquid phase includes a liquid and a diffusion controller that controls the diffusion of the liquid and its contact with the solid particulates. The dough-like confectionery material is viscous so that the confectionery material can be applied, optionally under pressure, to form a desirable product in a range of physical conditions extending from hard to soft and non-crunchy to crunchy in as little as a single application.

SUMMARY OF THE INVENTION

One embodiment is a technology for producing layers or regions of specially formulated layering materials that can be rapidly formed into a confectionery-material-containing product. This layering technology is premised on the discovery that rather than a water-laden solution of coating material, a dough-like confectionery material can be used to form the layer or region. The dough-like confectionery material contains a relatively small amount of liquid and is processed in a manner that enables the formation of a layer or region more rapidly than typical conventional panning techniques.

The dough-like confectionery material, as hereinafter defined, for forming the layer or region comprises a mixture of a solid particulate, a liquid, and a diffusion controller that controls the diffusion rate of the liquid to limit contact of the liquid and the solid particulate. The dough-like confectionery material has sufficient flexibility and cohesiveness so that it can be applied, optionally under pressure, to form a layer or region of the product. In addition, the diffusion controller, which typically dissolves in the liquid, surrounds the solid particulate and hardens to form, as desired, a hard or soft layer.

In one embodiment, there is provided a confectionery material comprising at least one layer or region comprising a solid particulate with at least a major portion of the solid particulate surrounded by a hardened diffusion controller.

In a second embodiment, the confectionery material is incorporated into an intermediate product that comprises an edible substrate and the confectionery material described above.

In a third embodiment, there is described a dough-like confectionery composition comprising a solid phase and a liquid phase, at least a major portion of the solid phase being surrounded by the liquid phase, in which the solid phase comprises the solid particulate and the liquid phase comprises a mixture of a liquid and a diffusion controller.

In a fourth embodiment, there are provided methods of forming the confectionery material by forming the dough-like confectionery composition and then forming the same into the confectionery material.

In a fifth embodiment, a confectionery-material-containing intermediate product is formed by first forming the dough-like confectionery composition, forming the same into a preliminary confectionery material, and applying the preliminary confectionery material to an edible substrate.

In a sixth embodiment, the confectionery-material-containing intermediate product is further treated to reduce the amount of liquid in the preliminary confectionery material to form a confectionery-material-containing product.

In a seventh embodiment, there is provided an apparatus forming the confectionery material comprising means for forming the dough-like confectionery composition and the means for applying the dough-like confectionery composition to an edible substrate.

In an eighth embodiment, there is provided an apparatus for forming the confectionery material containing product by utilizing means for reducing the amount of liquid in the confectionery material intermediate product.

In a ninth embodiment, the amount of the liquid of the dough-like confectionery material is less than in customary panning and preferably no more than 20% by weight.

In a tenth embodiment, the dough-like confectionery material is formed at ambient temperatures.

In an eleventh embodiment, the confectionery material comprising at least one layer or region is formed at ambient temperatures.

In a twelfth embodiment, a single layer is applied to the edible substrate to form the confectionery material containing intermediate product.

BRIEF DESCRIPTION OF THE FIGURES

The following figures in which like referenced characters indicate like parts are illustrative of embodiments of the invention, and are not to be construed as limiting the invention as encompassed by the claims forming part of the Application.

DETAILED DESCRIPTION OF THE INVENTION

Figure 1:
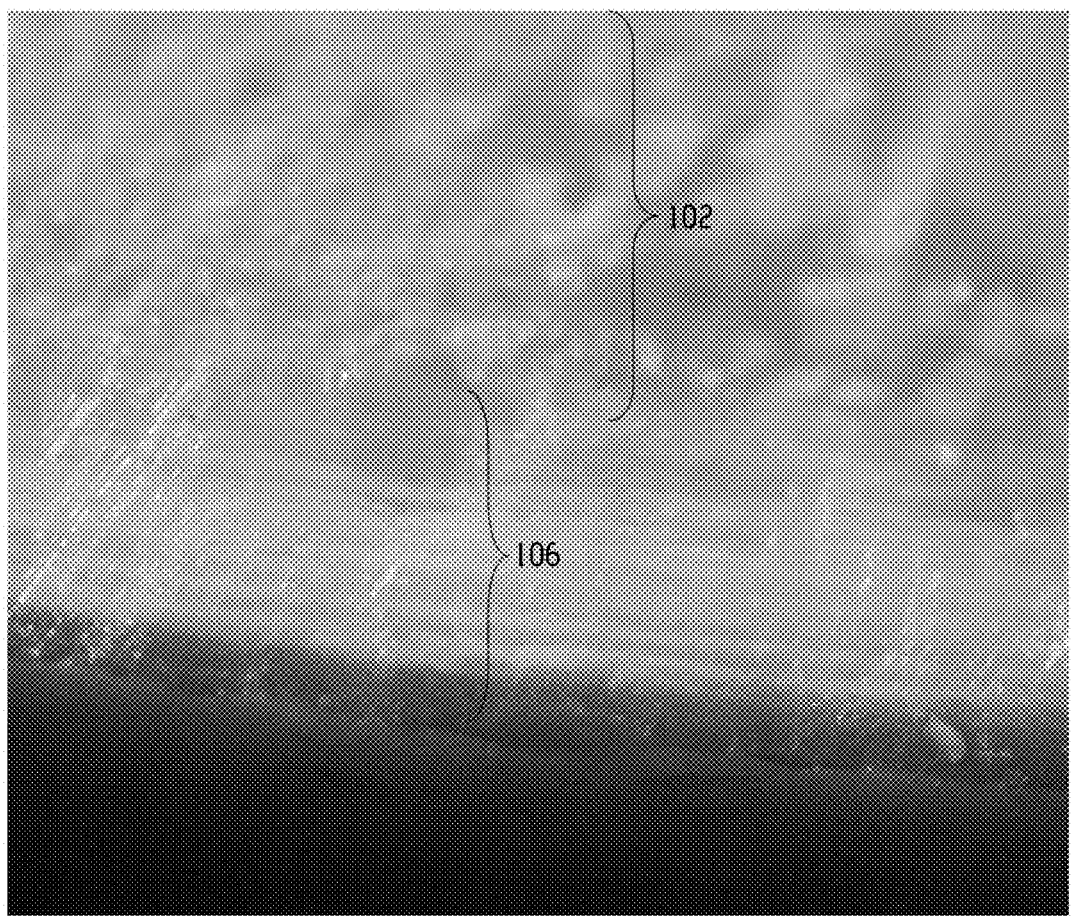
FIG. 1 is a photomicrograph of a conventional hard panned coating on a substrate.

One embodiment is a confectionery-material-containing, multi-region product containing at least one layer or region produced from a dough-like confectionery material as described herein. A dough-like confectionery material is employed as the layering or coating material, having a reduced concentration of liquid as compared to conventional syrup materials. Due to the high concentration of solid particulates, the correspondingly low level of moisture in the liquid can be relatively quickly and easily removed once the layering material has been applied to an edible substrate, as hereinafter defined. The dough-like confectionery material is produced from a solid particulate such as a bulk sweetener, a liquid, and a diffusion controller, as hereinafter defined. The multi-region product can be formed when the dough-like confectionery material is applied, preferably under pressure, to bond the layering material to the edible substrate. Edible substrates can include a range of compositions including, but not limited to, chewing gum, chocolate confectionery, hard confectionery, soft confectionery, and the like. The dough-like confectionery material is typically heterogeneous, containing solid particulates (which may be as small as nano-sized particles) with a viscous material obtained from a mixture of a liquid and a diffusion controller. This heterogeneous material is typically homogeneously blended. The structure of the dough-like confectionery material enables the formation of a desirable multi-region product and, in some preferred embodiments, the dough-like confectionery material is substantially free of air bubbles. One such example of the multi-region product has a crunch-type hard coating in which the layer or region exhibits organoleptic properties similar to conventional hard panned products, but with significant structural differences and at least most of the solid particulates retain their original form.

As used herein, the term "confectionery material" shall mean a composition made from a solid particulate and a mixture of a liquid and a diffusion controller, in which the diffusion controller can harden to the extent necessary to form a hard or soft layer or region. A "preliminary confectionery material or composition" means the composition described above before hardening has occurred. In some embodiments, the confectionery layer or region has a first moisture content before processing, a second moisture content during processing, and a third moisture content after processing. Typically, the first moisture content is greater than the second moisture content, which in turn is greater than the third moisture content. For example, in some embodiments, the first moisture content is about 8% to about 15%, and the second moisture content is about 4% to about 6%, and the third moisture content is less than 2%, wherein all weight percents are based on the total weight of the confectionery layer or region.

As used herein, the term "dough-like confectionery material" is synonymous with the terms "layering material" or "coating material" and shall mean a mass of layering material or coating material. The dough-like confectionery material is non-flowable and can be kneaded and rolled, and can therefore be applied to a substrate such as a core to form, after further processing and the removal of at least some of the liquid, at least one hard or soft layer or region of "confectionery material". The layer or region may be non-crunch or may exhibit varying degrees of crunchiness.

The terms "hard layer or region" and "soft layer or region" are given their customary meanings as used in the confectionery art. A soft layer stretches or "gives" when a stress inducing force is applied. A hard layer breaks when a break inducing force is applied, due to a sudden drop in resistance to the break inducing force. Here, layers with varying degrees of hardness or softness can be formed (i.e., the dough-like confectionery material can be prepared in a manner that enables formation of a layer or region with a preselected hardness or softness).

The term "crunch layer or region" is given its customary meaning in the confectionery art and means a layer or region which upon chewing undergoes cracking at multiple locations and typically produces an audible cracking sound.

The term "substrate" or "edible substrate" means any edible material, hard or soft, including varying degrees of hardness or softness, that can receive a confectionery material, typically in the form of a layer or region, to form a confectionery material. Examples of suitable substrates include, but are not limited to, a core such as chewing gum, bubble gum, fat based gum, such as described in U.S. Patent Application Publication No. US 2008/0057155 A1, incorporated herein by reference, candy gum, including crunch gum and marshmallow gum such as described in U.S. Patent Application Publication Nos. US 2008/0166449 A1 and US 2008/0199564 A1, each incorporated herein by reference, relatively soft/hard gums which turn hard/soft or remain soft/hard after chewing, candy, chocolate and combinations thereof including gum and candy combinations including soft and hard layers or regions with varying degrees of crunchiness, a layer or region of layering material as defined above, any other edible material that can be employed in an edible composition, including hard or soft layers or regions of conventional materials applied by conventional methods, such as hard panning and soft panning, or the like. Some edible substrates are considered too difficult to coat by conventional panning techniques. Such substrates include gum base, sticky gum substrates, as well as hygroscopic, moisture sensitive and/or heat sensitive substrates. All of these substrates may be used.

The term "confectionery-material-containing product" or "multi-region confectionery composition" means any edible product such as a confectionery composition, including a chewing gum composition, containing at least one layer or region of the confectionery material. The layer or region need not appear as a coating. For products having a coating, the product may comprise one or more layers or regions of the confectionery material, with the understanding that at least one of the layers or regions, but not necessarily all of the layers or regions, shall be produced as described herein. Examples of confectionery material containing products include a product comprising a center-fill, a gum region, and the present confectionery material, wherein the gum is a conventional gum and/or a crunch gum.

The term "confectionery-material-containing intermediate product" shall mean a product containing a preliminary confectionery material and an edible substrate that has not yet been processed to remove the liquid to enable the diffusion controller to harden around the solid particulates. In some embodiments, the confectionery layer or region has a first moisture content before processing, a second moisture content during processing, and a third moisture content after processing. Typically, the first moisture content is greater than the second moisture content, which in turn is greater than the third moisture content. For example, in some embodiments, the first moisture content is about 8% to about 15%, and the second moisture content is about 4% to about 6%, and the third moisture content is less than 2%, wherein all weight percents are based on the total weight of the confectionery layer or region.

The term "pressure" shall mean the application of force to the dough-like confectionery material at or about the time of its application to the edible substrate or shortly thereafter, so that it can form a layer or region on the edible substrate.

The term "hardened" refers to the reduction of liquid from the dough-like confectionery material and the consequential physical change of the diffusion controller from a liquid phase to a solid phase. "Hardened" also refers to a composition having the "third moisture content" defined above.

The solid particulates for use in producing the dough-like confectionery material are typically in the form of granules, powders, aggregates, crystals, non-crystalline solids, and combinations thereof, including nano-sized particles. The solid particulates can be selected from sugar materials including sucrose, glucose, fructose and corn syrup, and mixtures thereof, as well as conventional sugarless materials. Preferred sugarless materials are polyols, including sorbitol, maltitol, xylitol, erythritol, mannitol, isomalt, polyglucitols, polyglycitols, hydrogenated starch hydrolysates, and mixtures thereof. The amount of the solid particulates will typically be in the range of about 50 to 95% by weight based on the weight of the dough-like confectionery material, preferably from about 76 to 95% by weight.

The liquid employed in the dough-like confectionery material is selected from liquids that dissolve the diffusion controller and can be effectively removed from the dough-like confectionery material once it has been applied to the edible substrate, such as an edible core, without using excessively high drying temperatures or excessively long drying times. Preferably, the liquid can be removed rapidly at room temperatures. Preferred liquids are include water, glycerin, hydrogenated starch hydrolysates, polyol syrups, and mixtures thereof. Water is a preferred liquid. The amount of the liquid is generally less than what would be used in standard panning. Preferably, the amount of liquid is no more that about 20% by weight of the dough-like confectionery material, and more preferably no more than about 12% by weight, and even more preferably the amount of the liquid is about 4 to 12% by weight, and most preferably 7 to 11% by weight.

The dough-like confectionery material also includes a diffusion controller, which effectively controls the rate of diffusion of the liquid through the dough-like confectionery material. As a consequence, excessive contact with the solid particulates is avoided so that the combination of the liquid and the diffusion controller surrounds at least a major portion of the intact solid particulates. The diffusion controller may also function as a viscosity modifier to modify the viscosity of the dough-like confectionery material to exhibit dough-like properties (i.e., so that it can be kneaded and/or rolled), so that it can be readily applied to the edible substrate, as hereinafter described.

Suitable diffusion controllers include xanthan gum, carboxymethyl cellulose, methyl cellulose, hydroxypropylmethyl cellulose, starch, modified starches, inulin, konjac, chitosan, tragacanth, karaya, ghatti, larch, carageenan, alginate, chemically modified alginate, agar, guar, locust bean, *psyllium*, tara, gellan, curdlan, pullan, gum arabic, gelatin, and pectin, as well as mixtures thereof. Xanthan gum is a preferred diffusion controller. In some embodiments, high molecular weight polymers are preferred for the diffusion controller.

The amount of the diffusion controller can vary over a wide range, with an amount being selected to provide the dough-like confectionery material with properties that allow it to be kneaded and rolled, making it suitable for application to the edible substrate and preferably suitable to be pressured, such as by compressive lamination onto the substrate, as hereinafter described. Generally, the amount of the diffusion controller is in the range of about 1 to 25% by weight, based on the weight of the dough-like confectionery material, preferably from about 2 to 10% by weight, most preferably 3 to 5% by weight.

In a preferred embodiment, the liquid is water and the diffusion controller is xanthan gum. The preferred weight ratio of water to xanthan gum is about 1.5:1 to about 2.5:1.

The dough-like confectionery material is made by combining liquid phase components and solid phase components. The liquid phase components comprise the liquid and the diffusion controller. The solid phase components comprise solid particulates, such as solid particles of a bulk sweetener. Typically, the liquid phase components for forming the dough-like confectionery material are in an amount of about 5 to 50% by weight, and the solid phase components are in the amount of about 50 to 95% by weight, based on the combined weight of the liquid phase and solid phase components. The preferred weight ratio of the liquid phase to the solid phase is about 0.1:1 to about 0.15:1.

The dough-like confectionery material can, optionally, also contain an osmotic pressure controller, which serves to reduce the rate and extent of dissolution of the solid particulate in the liquid. By reducing the rate of dissolution of the solid particulate, more of the solid particulate is maintained in its original solid form in the dough-like confectionery material, making it easier for the liquid to be removed, and favoring mild conditions for removal of the liquid. Osmotic pressure controllers are typically soluble in the liquid and include carbohydrates having a molecular weight of less than about 2,000 daltons, as well as dextrans. Typical examples of osmotic pressure controllers are bulk sweeteners that may be the same as or different from the bulk sweeteners used as part of the original ingredients forming the dough-like confectionery material. Thus, the osmotic pressure controller includes sugars and sugarless materials, including polyols and sugar alcohols, as described previously. In some embodiments, the osmotic pressure controller is a maltitol syrup. The maltitol syrup can be prepared from maltitol and water. Alternatively, a commercially available maltitol syrup can be used. It should be noted that some commercially available maltitol syrups contain hydrogenated oligosaccharides and hydrogenated polysaccharides in addition to maltitol and water. In some embodiments, the maltitol syrup contains, on a dry weight basis, about 50 to about 60 weight percent maltitol, and about 30 to about 50 weight percent of higher polyols. In other embodiments, the maltitol syrup contains, on a dry weight basis, about 70 to about 80 weight percent maltitol, and about 25 to about 50 weight percent of higher polyols. The osmotic pressure controller is typically present in an amount of about 1 to 25% by weight, preferably about 2 to 10% by weight, based on the weight of the dough-like confectionery material.

The dough-like confectionery material may also include intense sweeteners, such as aspartame, acesulfame potassium, sucralose, and the like, which are employed to adjust the relative sweetness of the layer or region. The amount of the intense sweeteners will typically range from about 0.05 to about 1.0% by weight of the dough-like confectionery material, preferably from about 0.1 to about 0.6% by weight.

In addition to the components described above for forming the dough-like confectionery material, active agents may be added in effective amounts so that the product becomes a delivery vehicle, preferably an oral delivery vehicle. An effective amount of the active agents is known to those skilled in the art. A wide variety of active agents may be employed in the layer or region, and/or within other areas of the product, including those having a nutritional and/or therapeutic effect. Included among the active agents are flavor agents, sensate agents, coloring agents, demulcents, and functional agents, including breath freshening agents, dental care agents, pharmaceutical agents, vitamins, minerals, nutraceuticals, and the like. The present confectionery composition is particularly suitable for inclusion of active agents that are heat sensitive, moisture sensitive and/or water reactive including, but not limited to volatile flavor agents, sugar alcohols (e.g., xylitol), and food-grade acids. This advantage may reduce the amount of heat-sensitive and/or moisture-sensitive agents that are required to make a confectionery product.

Suitable flavor agents may include natural and artificial flavors. These flavorings may be chosen from synthetic flavor oils and flavoring aromatics and/or oils, oleoresins and extracts derived from plants, leaves, flowers, fruits, and so forth, and combinations thereof. Non-limiting representative flavor oils include spearmint oil, cinnamon oil, oil of wintergreen (menthyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and *cassia* oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya and so forth. Other potential flavors whose release profiles can be managed include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a *capsicum* flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below.

Other flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. These may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2-hexenal (berry fruits), tolyl aldehyde (cherry, almond), veratraldehyde (vanilla), 2,6-dimethyl-5-heptenal, melonal (melon), 2,6-dimethyloctanal (green fruit), and 2-dodecenal (citrus, mandarin), cherry, grape, blueberry, blackberry, strawberry shortcake, and mixtures thereof.

Sensate agents include cooling agents, warming agents, tingling agents, effervescent agents, and combinations thereof.

A variety of well known cooling agents may be employed. For example, among the useful cooling agents are included xylitol, erythritol, dextrose, sorbitol, menthane, menthone, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of para-menthane, 2-mercaptocyclodecanone, hydroxycarboxylic acids with 2 to 6 carbon atoms, cyclohexanamides, menthyl acetate, menthyl salicylate, N-2,3 trimethyl-2-isopropyl butanamide (known as WS-23), N-ethyl-p-menthane-3-carboxamide (known as WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate (from Haarmann & Reimer, FEMA 3748, tradename FRESCOLAT® type ML), WS-30, WS-14, eucalyptus extract (p-mentha-3,8-diol), menthol (its natural or synthetic derivatives), menthol PG carbonate, menthol EG carbonate, menthol glyceryl ether, N-tertbutyl-p-menthane-3-carboxamide, para-menthane-3-carboxylic acid glycerol ester, methyl-2-isopropyl-bicyclo (2.2.1) Heptane-2-carboxamide; and menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032,661; 4,459,425; 4,136,163; 5,266,592; 6,627,233.

Warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. In some embodiments, useful warming compounds can include vanillyl alcohol-n-butylether (TK 1000) supplied by Takasago Perfumary Company Limited, Tokyo, Japan, vanillyl alcohol n-propylether, vanillyl alcohol isopropylether, vanillyl alcohol isobutylether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, isoamylalcohol, benzyl alcohol, glycerine, and combinations thereof.

Sensate agents providing a tingling sensation include jambu, oleoresin, or spilanthol. In some embodiments, alkylamides extracted from materials such as jambu or sanshool may be included.

Sensate agents providing an effervescent sensation include the combination of an alkaline material with an acidic material. In some embodiments, an alkaline material can include alkali metal carbonates, alkali metal bicarbonates, alkaline earth metal carbonates, alkaline earth metal bicarbonates, and mixtures thereof. In some embodiments, an acidic material can include acetic acid, adipic acid, ascorbic acid, butyric acid, citric acid, formic acid, fumaric acid, gluconic acid, lactic acid, phosphoric acid, malic acid, oxalic acid, succinic acid, and tartaric acid, and combinations thereof. Examples of "tingling" type sensates can be found in U.S. Pat. No. 6,780,443, the entire contents of which are incorporated herein by reference for all purposes.

Sensate agents also include "trigeminal stimulants" such as those disclosed in U.S. Patent Application Publication No. 2005/0202118 A1, which is incorporated herein by reference. A trigeminal stimulant is defined as an orally consumed product or agent that stimulates the trigeminal nerve. Examples of cooling agents which are trigeminal stimulants include menthol, WS-3, N-substituted p-menthane carboxamide, acyclic carboxamides including WS-23, WS-5, WS-14, methyl succinate, and menthone glycerol ketals. Trigeminal stimulants can also include flavors, tingling agents, Jambu extract, vanillyl alkyl ethers, such as vanillyl n-butyl ether, spilanthol, Echinacea extract, Northern Prickly Ash extract, capsaicin, *capsicum* oleoresin, red pepper oleoresin, black pepper oleoresin, piperine, ginger oleoresin, gingerol, shoagol, cinnamon oleoresin, *cassia* oleoresin, cinnamic aldehyde, eugenol, cyclic acetal of vanillin and menthol glycerin ether, unsaturated amides, and combinations thereof. Other cooling compounds can include derivatives of 2,3-dimethyl-2-isopropylbutyric acid, such as those disclosed in U.S. Pat. No. 7,030,273, which is incorporated herein by reference.

Sensate agents also include compounds that provide a cooling sensation provided by materials exhibiting a negative heat of solution including, but not limited to, polyols such as xylitol, erythritol, dextrose, and sorbitol, and combinations thereof.

In some embodiments, sensate agents are used at levels that provide a perceptible sensory experience, i.e., at or above their threshold levels. In other embodiments, sensate components are used at levels below their threshold levels such that they do not provide an independent perceptible sensory experience. At sub-threshold levels, the sensates may provide an ancillary benefit such as flavor or sweetness enhancement.

Coloring agents include but are not limited to annatto extract, (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), and combinations thereof.

Certified colors may also be used and include, but are not limited to, FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof.

Demulcents useful as active agents may include pectin or polymeric materials that moisturize or soothe irritated mouth or throat tissues. The demulcents may also have humectant activity, meaning that the substance absorbs moisture and moisturizes tissues in contact with the humectant substance.

Demulcents useful herein may include hydrocolloid materials that hydrate and adhere to oral surfaces to provide a sensation of mouth or throat moistening. Hydrocolloid materials can include naturally occurring materials such as plant exudates, seed gums, and seaweed extracts or they can be chemically modified materials such as cellulose, starch, or natural gum derivatives. In some embodiments, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, bacterial gums, and combinations thereof. Additionally, in some embodiments, modified natural gums such as propylene glycol alginate, carboxymethyl locust bean gum, low methoxyl pectin, and their combinations can be included. In some embodiments, modified celluloses can be included such as microcrystalline cellulose, carboxymethylcellulose (CMC), methylcellulose (MC), hydroxypropylmethylcellulose (HPMC), and hydroxypropylcellulose (HPC), and combinations thereof.

Similarly, demulcents which can provide a perception of mouth hydration may be included. Such demulcents can include, but are not limited to glycerol, sorbitol, polyethylene glycol, erythritol, and xylitol.

Additionally, in some embodiments, the demulcents may be fats or lipids. Such fats can include medium chain triglycerides, vegetable oils, fish oils, mineral oils, and combinations thereof. Desirably, fats used herein may be high melting, hydrogenated, or gelled fats. In some embodiments, normally low melting fats are hydrogenated so the fats are solid at room temperature. Alternatively, the demulcents may be monoglycerides or polyglycerol fatty acid esters. Such monoglycerides and polyglycerol fatty acid esters help promote the setting ability of liquid oils, as well as forming gels. This effect can be very significant for gel strength (up to a 500-fold increase) with minimal increase in melting point of the gelled oil.

Demulcents may be treated so that they are present as a solid at room temperature. Alternatively, the demulcent may be in a liquid form at room temperature.

In some embodiments, the layer or region material may include one or more functional agents, including surfactants, breath freshening agents, pharmaceutical agents, nutrition supplements, oral care agents, throat care agents, and combinations thereof. Pharmaceutical agents contemplated for use herein may include, but are not limited to, throat soothing agents, analgesics, anesthetics, antiseptics, cough suppressants, antitussives, expectorants, antihistamines, mucolytics, and nasal decongestants. In addition, other pharmaceutical agents, as discussed below, may be employed herein.

Throat soothing ingredients may include analgesics, anesthetics, antiseptic, and combinations thereof. In some embodiments, analgesics or anesthetics may include menthol, phenol, hexylresorcinol, benzocaine, dyclonine hydrochloride, benzyl alcohol, salicyl alcohol, and combinations thereof. In some embodiments, antiseptic ingredients may include cetylpyridinium chloride, domiphen bromide, dequalinium chloride, and combinations thereof. Throat soothing agents include honey, propolis, aloe vera, green or red pepper extract, glycerine, menthol and combinations thereof.

Cough suppressants may fall into two groups: those that alter the consistency or production of phlegm such as mucolytics and expectorants; and those that suppress the coughing reflex such as codeine (narcotic cough suppressants), antihistamines, dextromethorphan and isoproterenol (non-narcotic cough suppressants). In some embodiments, ingredients from either or both groups may be included.

In still other embodiments, antitussives may be used, and include, but are not limited to, the group consisting of codeine, dextromethorphan, dextrorphan, diphenhydramine, hydrocodone, noscapine, oxycodone, pentoxyverine and combinations thereof.

In some embodiments, antihistamines may be added, and include, but are not limited to, acrivastine, azatadine, brompheniramine, chlorpheniramine, clemastine, cyproheptadine, dexbrompheniramine, dimenhydrinate, diphenhydramine, doxylamine, hydroxyzine, meclizine, phenindamine, phenyltoloxamine, promethazine, pyrilamine, tripelennamine, triprolidine and combinations thereof. In some embodiments, non-sedating antihistamines may include, but are not limited to, astemizole, cetirizine, ebastine, fexofenadine, loratidine, terfenadine, and combinations thereof.

In some embodiments, expectorants may be added, and include, but are not limited to, ammonium chloride, guaifenesin, ipecac fluid extract, potassium iodide and combinations thereof. In some embodiments, mucolytics may be added, and include, but are not limited to, acetylcycsteine, ambroxol, bromhexine and combinations thereof. In some embodiments, analgesic, antipyretic and anti-inflammatory agents may be added, and include, but are not limited to, acetaminophen, aspirin, diclofenac, diflunisal, etodolac, fenoprofen, flurbiprofen, ibuprofen, ketoprofen, ketorolac, nabumetone, naproxen, piroxicam, caffeine and mixtures thereof. In some embodiments, local anesthetics may include, but are not limited to, lidocaine, benzocaine, phenol, dyclonine, benzonotate and mixtures thereof.

In some embodiments nasal decongestants and ingredients that provide the perception of nasal clearing may be included. In some embodiments, nasal decongestants may include but are not limited to phenylpropanolamine, pseudoephedrine, ephedrine, phenylephrine, oxymetazoline, and combinations thereof.

A variety of nutritional supplements may also be used as active ingredients including virtually any vitamin or mineral. For example, vitamin A, vitamin C, vitamin D, vitamin E, vitamin K, vitamin B6, vitamin B12, thiamine, riboflavin, biotin, folic acid, niacin, pantothenic acid, sodium, potassium, calcium, magnesium, phosphorus, sulfur, chlorine, iron, copper, iodine, zinc, selenium, manganese, choline, chromium, molybdenum, fluorine, cobalt and combinations thereof, may be used.

Examples of nutritional supplements that may be used as active ingredients are set forth in U.S. Patent Application Publication Nos. 2003/0157213 A1, 2003/0206993 A1, and 2003/0099741 A1, which are incorporated in their entirety herein by reference for all purposes.

Various herbals may also be used as active ingredients such as those with various medicinal or dietary supplement properties. Herbals are generally aromatic plants or plant parts and or extracts thereof that can be used medicinally or for flavoring. Suitable herbals may be used singly or in various mixtures. Commonly used herbs include Echinacea, Goldenseal, Calendula, Rosemary, Thyme, Kava Kava, Aloe, Blood Root, Grapefruit Seed Extract, Black Cohosh, Ginseng, Guarana, Cranberry, Gingko Biloba, St. John's Wort, Evening Primrose Oil, Yohimbe Bark, Green Tea, Ma Huang, Maca, Bilberry, Lutein, and combinations thereof.

Some embodiments set forth herein may include breath fresheners, which may include essential oils as well as various aldehydes, alcohols, and similar materials. In some embodiments, essential oils may include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, and orange. In some embodiments, aldehydes such as cinnamic aldehyde and salicylaldehyde may be used. Additionally, chemicals such as menthol, carvone, iso-garrigol, and anethole can function as breath fresheners. Of these, the most commonly employed are oils of peppermint, spearmint and chlorophyll.

In addition to essential oils and chemicals derived from them, in some embodiments breath fresheners may include but are not limited to zinc citrate, zinc acetate, zinc fluoride, zinc ammonium sulfate, zinc bromide, zinc iodide, zinc chloride, zinc nitrate, zinc fluorosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based materials, carbon-based materials, enzymes such as laccase, and combinations thereof.

In some embodiments, breath fresheners include, but are not limited to, lactic acid producing microorganisms such as *Bacillus coagulans, Bacillus subtilis, Bacillus laterosporus, Bacillus laevolacticus, Sporolactobacillus inulinus, Lactobacillus acidophilus, Lactobacillus curvatus, Lactobacillus plantarum, Lactobacillus jenseni, Lactobacillus casei, Lactobacillus fermentum, Lactococcus lactis, Pedioccocus acidilacti, Pedioccocus pentosaceus, Pedioccocus urinae, Leuconostoc mesenteroides, Bacillus coagulans, Bacillus subtilis, Bacillus laterosporus, Bacillus laevolacticus, Sporolactobacillus inulinus* and mixtures thereof. Breath fresheners are also known by the following trade names: Retsyn™, Actizol™, and Nutrazin™. Examples of malodor-controlling compositions are also included in U.S. Pat. No. 5,300,305 to Stapler et al. and in U.S. Patent Publication Nos. 2003/0215417 and 2004/0081713, which are incorporated in their entirety herein by reference for all purposes.

Dental care agents (also known as oral care ingredients) include, but are not limited to, tooth whiteners, stain removers, oral cleaning, bleaching agents, desensitizing agents, dental remineralization agents, antibacterial agents, anticaries agents, plaque acid buffering agents, surfactants and anticalculus agents. Non-limiting examples of such ingredients may include, hydrolytic agents including proteolytic enzymes, abrasives such as hydrated silica, calcium carbonate, sodium bicarbonate and alumina, other active stain-removing components such as surface-active agents, including, but not limited to anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. In some embodiments, dental care ingredients may also include tetrasodium pyrophosphate and sodium tri-polyphosphate, sodium bicarbonate, sodium acid pyrophosphate, sodium tripolyphosphate, xylitol, sodium hexametaphosphate.

In some embodiments, peroxides such as carbamide peroxide, calcium peroxide, magnesium peroxide, sodium peroxide, hydrogen peroxide, and peroxydiphospate are included. In some embodiments, potassium nitrate and potassium citrate are included. Other examples may include casein glycomacropeptide, calcium casein peptone-calcium phosphate, casein phosphopeptides, casein phosphopeptide-amorphous calcium phosphate (CPP-ACP), and amorphous calcium phosphate. Still other examples may include papaine, krillase, pepsin, trypsin, lysozyme, dextranase, mutanase, glycoamylase, amylase, glucose oxidase, and combinations thereof.

Further examples may include surfactants such as sodium stearate, sodium ricinoleate, and sodium lauryl sulfate surfactants for use in some embodiments to achieve increased prophylactic action and to render the dental care ingredients more cosmetically acceptable. Surfactants can preferably be detersive materials that impart detersive and foaming properties. Suitable examples of surfactants are water-soluble salts of higher fatty acid monoglyceride monosulfates, such as the sodium salt of the monosulfated monoglyceride of hydgrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl, or N-palmitoyl sarcosine.

In addition to surfactants, dental care ingredients may include antibacterial agents such as, but not limited to, triclosan, chlorhexidine, zinc citrate, silver nitrate, copper, limonene, and cetyl pyridinium chloride. In some embodiments, additional anticaries agents may include fluoride ions or fluorine-providing components such as inorganic fluoride salts. In some embodiments, soluble alkali metal salts, for example, sodium fluoride, potassium fluoride, sodium fluorosilicate, ammonium fluorosilicate, sodium monofluorophosphate, as well as tin fluorides, such as stannous fluoride and stannous chloride can be included. In some embodiments, a fluorine-containing compound having a beneficial effect on the care and hygiene of the oral cavity, e.g., diminution of enamel solubility in acid and protection of the teeth against decay may also be included as an ingredient. Examples thereof include sodium fluoride, stannous fluoride, potassium fluoride, potassium stannous fluoride ($SnF_2$—KF), sodium hexafluorostannate, stannous chlorofluoride, sodium fluorozirconate, and sodium monofluorophosphate. In some embodiments, urea may be included.

The present products exhibit additional advantages over conventional products, in part, because of the unique properties of the dough-like confectionery material. One such advantage relates to the product release profile of active agents including flavors. Because the dough-like confectionery material can be prepared at relatively low temperatures, flavors experience less temperature-related evaporative losses. Thus, the dough-like confectionery material can effectively and efficiently deliver higher amounts of flavor than conventional panned coatings or layers. This ability to more effectively and efficiently deliver higher amounts of flavor can enable the use of suggestive colors that better meet consumer expectations for more intense flavors. For example, a dark orange color can suggest an intense orange flavor experience. For conventional panned goods, the consumer expectation suggested by a dark orange color may not be met due to flavor evaporation. However, for multi-region products including the dough-like confectionery material, the consumer will be provided with the expected high-intensity orange flavor experience suggested by the dark orange color.

Some of the active agents are trapped by the diffusion controller thereby delaying their release. As a result, the release profile of active agents is extended beyond what is expected from conventional coated confectionery products.

It is also possible to incorporate all or some of the active agents directly within the diffusion controller. This technique can also be used to delay release the active agents.

The release profile can also be affected by incorporating the active agents to varying degrees in the solid phase and/or liquid phase of the dough-like confectionery material as well as the edible substrate.

The composition of the dough-like confectionery material, its physical properties, and the manner in which the dough-like confectionery material is applied to the edible substrate enables a layer or region to be formed. The present confectionery material can be provided as a single layer or as multiple layers. Because single layers of at least about 0.2 millimeter can be produced, there is often no need to provide multiple layers, which contributes to the significant reduction in production time. Furthermore, by controlling the amount of retained liquid, hard and soft layers or regions can be produced, even on the same product. When forming a soft layer or region, it is desirable to add to the dough-like confectionery composition a hydrophilic plasticizer in an amount of about 1 to 30% by weight, based on the weight of the dough-like confectionery composition. Typical plasticizers include glycerin, maltitol syrups (including those such as those sold by Roquette under the trade name LYCASIN), lecithin, propylene glycol, non-crystallizing syrups containing sugar alcohols or sugars such as sorbitol, maltitol, isomalt, erythritol, xylitol, glucose, fructose, sucralose or combinations thereof, polyethylene glycol, polyethylene oxide, and polyvinyl alcohols.

The dough-like confectionery composition has a water content and viscosity such that it can undergo an applied force so as to physically alter the relationship of the solid phase components and the liquid phase components. As a result, the diffusion controller and liquid disperse relatively uniformly in and around the solid particulates. When at least some of the liquid is removed, the diffusion controller hardens and the preliminary confectionery material forms a soft or hard layer or region. In some preferred embodiments, the solid particulates are dispersed within the dough-like confectionery material to produce a heterogeneous material. In some other preferred embodiments, the solid particulates are uniformly dispersed.

The diffusion controller hardens around the solid particulates to a sufficient extent so that upon removal of excess liquid, a hard, preferably crunch layer or region is created that does not rely on multiple deposits of crystallized layers, as in hard panning, to obtain crunch-like properties. By eliminating the conventional hard panning layers, as shown in FIG. 1, a crunch-like layer or region may be formed from as little as a single application of the dough-like confectionery material.

Figure 2:
FIG. 2 is a photomicrograph of an embodiment of dough-like confectionery material.

Referring to FIG. 2, there is shown a photomicrograph image of an example of the present dough-like confectionery material. As shown, there are solid particulates (SP) dispensed relatively uniformly throughout the material.

Generally surrounding the solid particulates is a liquid phase comprising a mixture of a liquid, such as water, and a diffusion controller, such as xanthan gum. The liquid phase protects the solid particulates so that they do not undergo a physical change of properties, as does occur in hard panning. When a portion of the liquid is removed from the dough-like confectionery material and the diffusion controller hardens, the dough-like confectionery forms a hard or soft layer or region.

Figure 3:
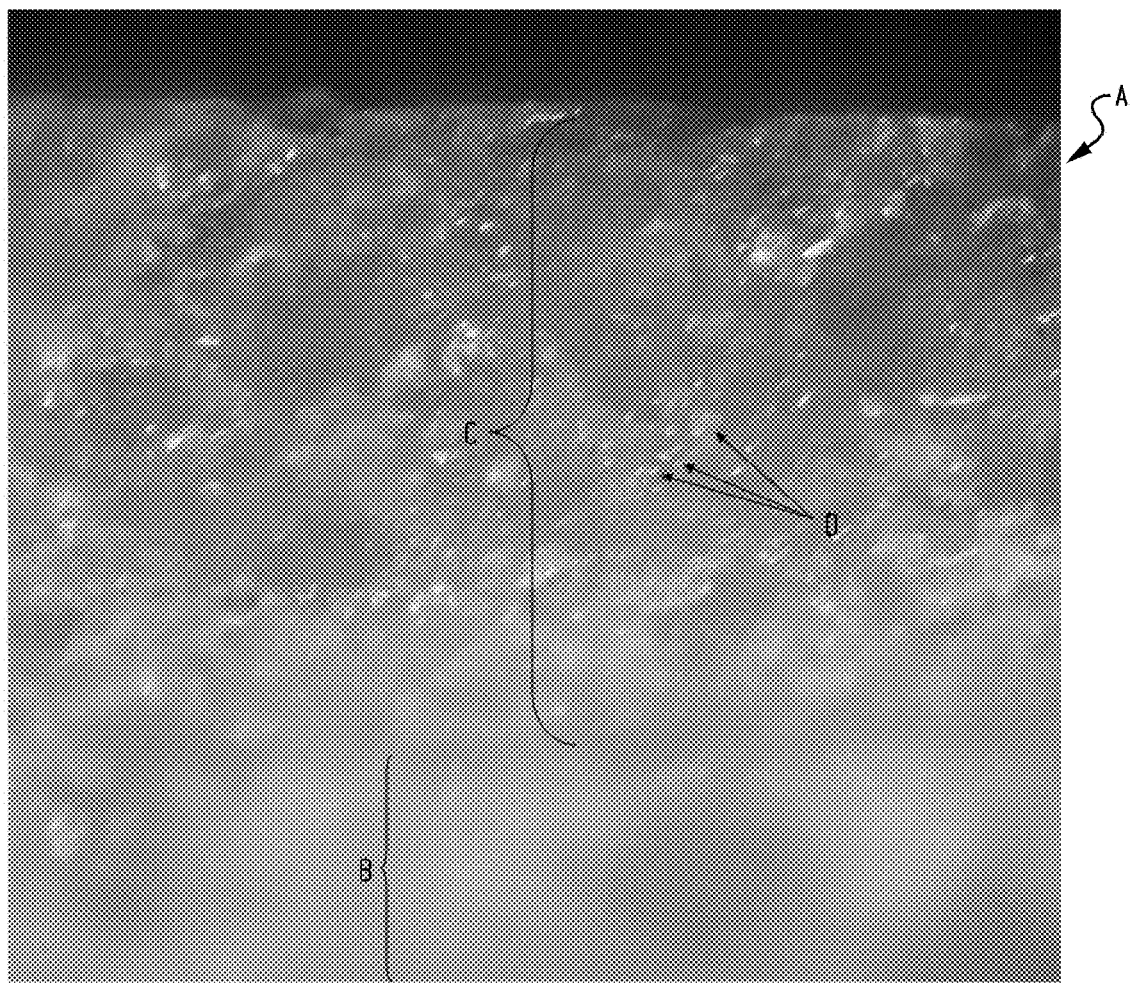
FIG. 3 is a photomicrograph of an embodiment of a layer applied on an edible substrate.

Referring to FIG. 3, there is shown a photomicrograph of an embodiment of a single layer in the form of a coating on a chewing gum core. More specifically, the hard layer containing product (A) is comprised of a core (B) made of a conventional chewing gum formulation known to those skilled in the art. The hard layer (C) covering the core (B) is characterized by an array of solid particulates (D) of, for example, a bulk sweetener (e.g., maltitol). The spaces (E) between the solid particulates (D) are filled with a diffusion controller that has had excess liquid (e.g., water) removed therefrom, and therefore has hardened. As a result, the solid particulates are separated by the hardened diffusion controller, and thereby form a layer or region of confectionery material that can simulate conventional hard and soft panned products. In some embodiments, the layer is substantially free of air bubbles.

As previously indicated, the confectionery material containing product requires as little as a single layer or region of the layering material, formulated and applied as previously described. The product may contain additional layers of the layering material formulated and described herein. In addition, products may include layers in which conventional coating materials and methods of application are used to provide one or more additional layers to form the product. For example, a product can be one in which one or more conventional layers (e.g., hard or soft pan layers) are applied to the core with a top coating layer (i.e., coating layer) applied in accordance with the present invention. In another example, the product may include top and bottom coating layers applied as described herein with one or more conventional intermediate layers applied therebetween.

Figure 7:
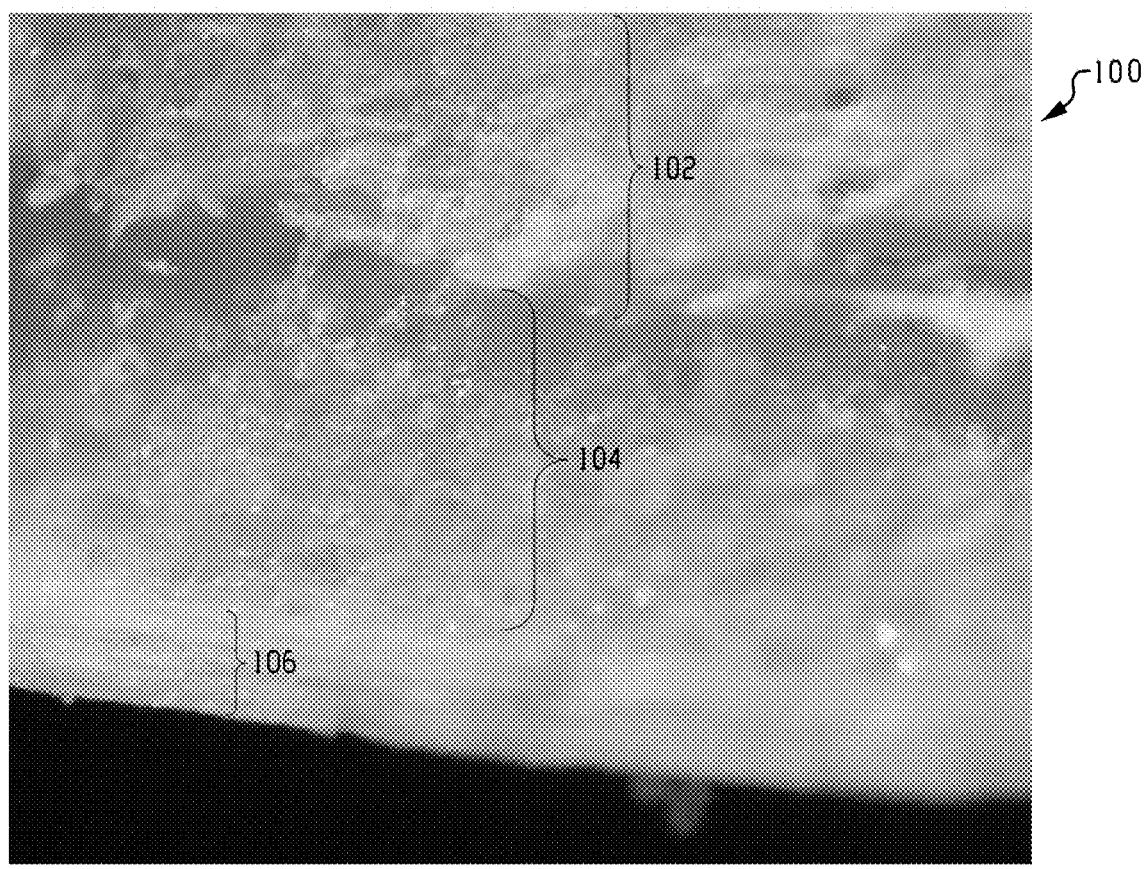
FIG. 7 is a photomicrograph of an embodiment of a product comprising an applied layer covered by conventional hard panning layers.

Referring to FIG. 7, there is shown an embodiment of a coated product 100 comprised of a core 102 (in this case a chewing gum formulation) and a layer 104 produced as previously described. Positioned on top of the layer 104 is a conventional hard panning array of layers 106, comprising a plurality of individual hard panning layers 108.

The array of layers 106 is applied in a conventional manner after completion of the application of the layer 104 by coextrusion or compressive lamination. For example, the intermediate product having the layer 104 thereon is placed in a rotating drum and sprayed with a sugar syrup material (e.g., saturated solution of a sugar alcohol) and then dried. The process may be repeated to apply additional conventional hard panning layers.

Conventional techniques for the application of conventional layers are known to those of ordinary skill in the art, and include conventional hard and soft panning technology as described in the following: "Sugarless Hard Panning", Robert Boutin, et al., *The Manufacturing Confectioner*, pp. 35-42, November 2004; "Panning Technology, An Overview: John Flanyak, *The Manufacturing Confectioner*, pp. 65-74, January 1998; "Crystallization and Drying During Hard Panning", Richard W, Hartel, *The Manufacturing Confectioner*, pp. 51-57, February, 1995; "Soft Panning", Michael J. Lynch, *The Manufacturing Confectioner*, pp. 47-50, November 1987; and "Panning—The Specialist's Specialty", Robert D. Walter, *Candy & Snack Industry*, pp. 43-51, December 1974. Each of these publications is incorporated herein by reference.

The general procedure for forming a product utilizing one or more conventional layers is to apply each layer to completion before applying the next layer.

The dough-like confectionery material may be produced by mixing the diffusion controller with the liquid, preferably under high shear conditions, such as in a Brabender mixer or single-screw extruder or twin-screw extruder, to form a diffusion controller sol. The solid particulate and optionally the liquid are separately mixed at elevated temperatures under mild stirring. The two mixtures are then combined with any additional ingredients, such as osmotic pressure controller, high intensity sweeteners, and active agents as previously described, and mixed in a suitable mixer, such as a Brabender mixer, until a cohesive dough-like confectionery material is formed.

The resulting dough-like confectionery material can be kneaded and rolled, and possesses pseudoplastic properties that allow it to be formed, optionally under pressure, into a layer or region. To form a layer or region, the dough-like confectionery material may be subjected to pressure such as compression to force the diffusion controller/liquid mixture to fill the spaces between the individual solid particulates. The pressure exerted on the mixture overcomes the surface tension at the point of contact between the liquid and the solid particulates, enabling the liquid mixture to surround the solid particulates. Because the surface tension arising when the mixture first contacts the solid particulates is broken the liquid mixture is enable to expand surface contact with the solid particulates. When the diffusion controller hardens, a soft or hard layer or region is formed.

The relative hardness of the layer or region may be controlled in two ways. First, adjustments can be made to the composition of the layering material, and second, adjustments can be made to the pressure exerted on the dough-like confectionery material during application to the edible substrate. Generally, softer layers are favored by increasing the amount of liquid and/or diffusion controller and/or by using a less viscous substance for this purpose. In addition, softer layers may be favored by using plasticizers, and in some embodiments omitting the use of polyol syrups as previously described.

The selection of a suitable solid particulate will depend in part on whether it is desirable to produce a sugar or sugarless layer or region, as well as other properties, such as tensile strength, solubility, and hygroscopicity. With respect to sugarless coatings, sugar alcohols are preferred. Sorbitol is a preferred sugar alcohol because of its relatively low cost. However, sorbitol is very hygroscopic, and therefore, unstable in the presence of water. Because of the relatively low amount of water necessary to form the dough-like confectionery material, sorbitol becomes a more viable layering material than it would be in conventional hard panning. Maltitol is also a desirable sugar alcohol because it is stable, and it incorporates well into the layering material.

The incorporation of the diffusion controller into the dough-like confectionery material is one of the marked departures from conventional technology. The diffusion controller protects the solid particulates (e.g., sugar alcohol) and maintains their properties while keeping the amount of liquid to a minimum. The diffusion controller also protects the viscosity of the material so that it can be kneaded and rolled into a cohesive semi-solid material typically associated with dough-like materials. The diffusion controller and the amount of the same provides the dough-like confectionery material with the properties of a pseudoplastic dough-like material that can be applied to the edible substrate in thicknesses not obtainable with conventional syrup materials.

The dough-like confectionery material has a first moisture content and possesses a level of cohesiveness before processing (i.e., before it is applied to the edible substrate) that enables it to be applied to the edible substrate as a layer or region. In some embodiments, the first moisture content can be from about 8% to about 15% by weight of the dough-like confectionery material. The level of cohesiveness overcomes the inherent "stickiness" of the layering material. The term "stickiness" refers to the tendency of the dough-like material to adhere to equipment (typically made of stainless steel) used to apply the same to the edible substrate. A high degree of stickiness means that at least a portion of the dough-like confectionery material is not released from the application equipment to the substrate. In formulating the dough-like confectionery material, the amount of "stickiness" can be adjusted, for example, by increasing or decreasing the amount of the diffusion controller.

The viscosity of the dough-like confectionery material is an important consideration. Desirably, the dough-like confectionery material is pseudoplastic, meaning that when a force is applied to it, the material reacts by exhibiting a counteractive force. More specifically, the material pushes back against the force and seeks to return to its original shape. Pseudoplastic materials instantaneously decrease in viscosity when the shear stress rate is increased, which is characteristic of high molecular weight molecules.

Tan Delta is the ratio of viscous modulus to elastic modulus and a useful quantifier of the presence and extent of elasticity in a fluid. The higher the Tan Delta value, the less elastic the viscoelastic liquid. A Tan Delta value of greater than 1 means that the material has more properties of a liquid than a solid. The dough-like confectionery material generally has a Tan Delta value of up to 1.5 (e.g., at 23° C.), preferably up to about 1.2. A more preferred value is about 0.2 to 0.8. In one embodiment, the flow behavior index (n) of dough-like confectionery composition is in a range of around 0.65 to around 0.85; preferably around 0.75 to around 0.85; more preferably around 0.78 to around 0.85.

It is desirable for the dough-like confectionery material to be applied to the edible substrate without permanently sticking to the apparatus used to apply the same. If the dough-like confectionery material is too sticky, it tends to adhere to the application equipment and thereby produce relatively uneven hard layers or regions and/or lowers the efficiency of the layering process, because a portion of the dough-like confectionery material is not applied to the substrate. In some embodiments, an anti-adherent agent is applied to the apparatus, the surface(s) of the substrate and/or the dough-like confectionery material. Suitable anti-adherent agents can include, but are not limited to, fats, oils, waxes, talc, low hygroscopicity materials such as sucrose, mannitol, and the like. The anti-adherent agents can be applied as powders or liquids.

A high degree of stickiness may be caused by excessive amounts of solid particulates in the layering material. Accordingly, the amount of the diffusion controller can be increased to reduce the stickiness, as desired. Desirably, the dough-like confectionery material has a structural integrity enabling it to be processed on application equipment and be released therefrom to form a layer or region on the substrate that adheres thereto to form an intermediate product (i.e., substrate when first covered with the dough-like confectionery material having a second moisture content during processing), subject to post application treatment, as described hereinafter. This second moisture content is sufficient to allow scoring of the intermediate product without cracking. In some embodiments, the second moisture content is about 4% to about 6% by weight of the dough-like confectionery material. In the process of forming the confectionery-material-containing product, the ends of the sheet are typically trimmed. The "trim" material may be readily recycled with new layering material, new core material or the dough-like confectionery material. In some embodiments, up to 10% of the trim material can be combined with the layering material. In this event, the pseudoplastic properties of the resulting layering material may change. The trim material may be ground to facilitate mixing with the core material.

Although not required, it is sometimes desirable to apply pressure on the intermediate product to provide better adherence of the dough-like confectionery material to the edible substrate and to facilitate movement of liquid within the dough-like confectionery material to the surface. This pressure facilitates removal of the liquid in a relatively short time and under mild conditions and may be helpful in making the dough-like confectionery material substantially free of air bubbles. In addition, the applied pressure helps the liquid fill the voids between the solid particulates. The dough-like confectionery material will then have a third moisture content after processing. In some embodiments, the third moisture content will be below 2% by weight of the dough-like confectionery material.

As previously indicated, two preferred methods by which the dough-like confectionery material may be applied to the substrate are coextrusion and compressive lamination. Coextrusion typically employs a concentric die assembly having an inner die portion and an outer die portion. The inner die portion may contain the substrate material while the outer die portion may contain the dough-like confectionery material. When coextrusion is performed, there may be enough pressure applied between the coextruded materials that the application of subsequent pressure (e.g., compression) is not necessary.

Figure 4:
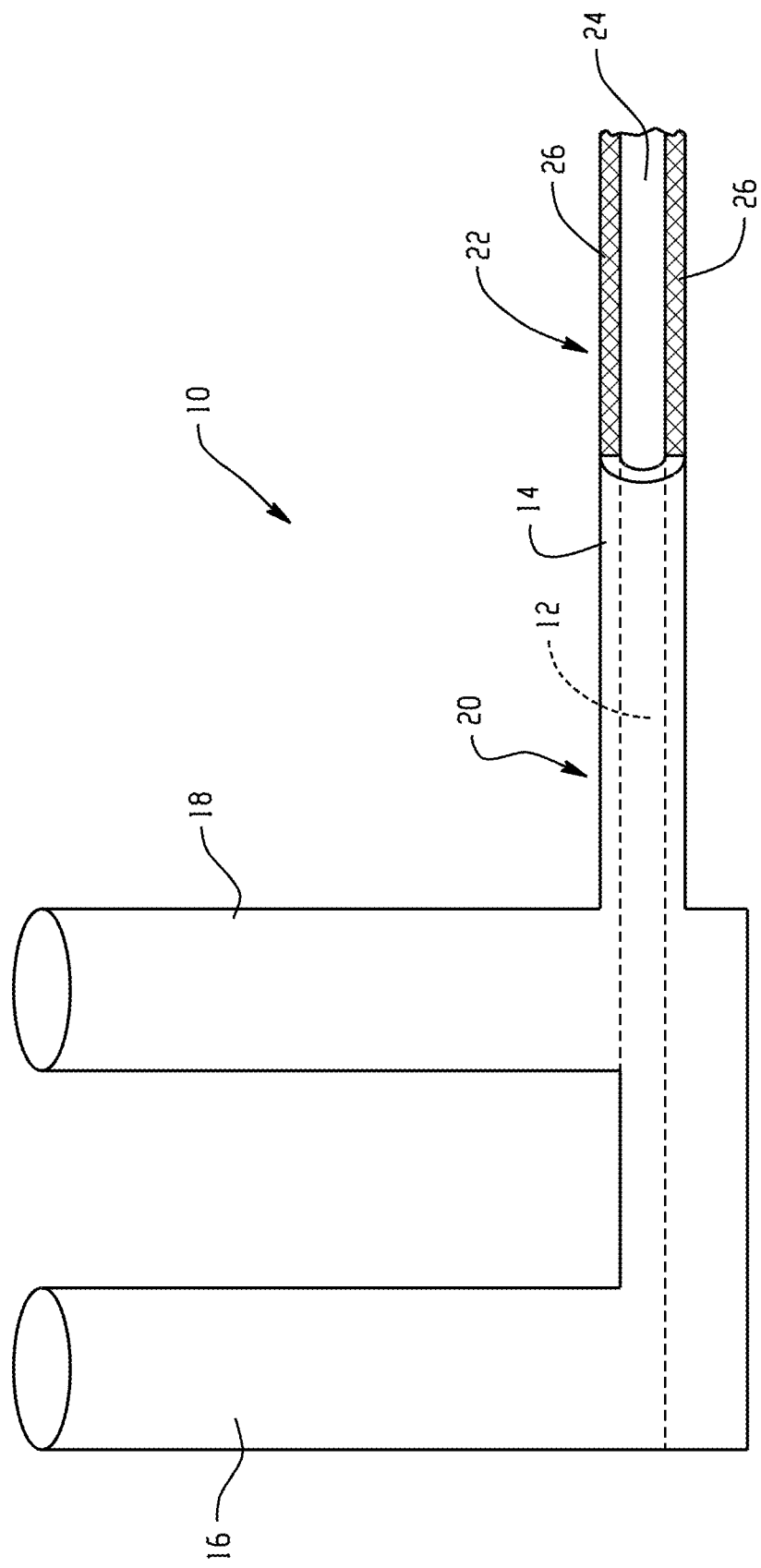
FIG. 4 is a diagrammatic view of an embodiment wherein the layering material is coextruded with the substrate.

An example of a coextrusion assembly is shown in FIG. 4. Referring to FIG. 4, there is shown a coextrusion assembly 10 comprising an inner die portion 12 and an outer die portion 14. The substrate (e.g., core material) is provided from a source of substrate 16, while the layering material in the form of a dough-like confectionery material is provided from a source 18. The respective extruded materials contact each other in a target area 20, at which point pressure is applied by constriction of the extruded materials, sufficient to compress the same into a coextruded material 22 as it leaves the respective die portions 12, 14. As a result, the extruded materials bond together and facilitate moving liquid in the dough-like confectionery material into the void spaces between solid particulates. The coextruded material 22, having a core 24 and layering material 26 as shown specifically in FIG. 4, exits from the die portions 12 and 14 and may be further processed, as described hereinafter.

The temperature of the coextrusion process is generally in the range of about 60 to about 180° F. (about 16 to about 82° C., preferably about 80 to about 140° F. (about 27 to about 60° C.). A preferred coextrusion assembly is Bepax, manufactured by Bepax, Inc. The temperatures employed to extrude the substrate (e.g., chewing gum) may be different from the temperature used to extrude the dough-like confectionery material. Typically, the dough-like confectionery material may be extruded at or about room temperature, while the substrate will typically be extruded at higher temperatures (e.g., for chewing gum, a typical extrusion temperature is about 120° F. (about 49° C.)).

Although not shown in FIG. 4, the coextruded material 22 may be subjected to pressure after removal from the coextrusion assembly to further facilitate movement of liquid into the void spaces, as previously described. A roller assembly comprising spaced apart rollers as shown and described hereinafter in connection with FIG. 5 may be used for this purpose.

The coextruded material (i.e., intermediate product) 22 may, but need not, undergo a drying procedure using conventional drying equipment (not shown). Drying may be performed under non-elevated to slightly elevated temperatures (e.g., slightly below room temperature to about 120° F. (49° C.)), and for only a few seconds, typically no more than about two seconds. This is a marked departure from conventional panning techniques, which can take several minutes to complete the drying process.

The intermediate product removed from the coextrusion system can optionally be dried, as described above, or forwarded directly to a conditioning unit to undergo conventional conditioning (i.e., exposure to room temperature under low humidity conditions, typically in a conditioning tunnel) followed by scoring into individual pieces of confection. What is a clear departure from conventional techniques is that final removal of water from the intermediate product can be accomplished by extremely short-term drying or conditioning alone. The present confectionery composition does not require long-term drying and conditioning, nor does it require the application of many layers of layering material.

The intermediate product may be scored on the side or sides which contain the dough-like confectionery material to provide greater flexibility as the intermediate proceeds through a conditioning tunnel. In particular, the conditioning tunnel comprises a series of conveyor rollers for transporting the intermediate product in a winding path. The scoring of the dough-like confectionery material provides areas of flexibility that enable the product to travel around the rollers without cracking.

The confectionery-material-containing intermediate product is typically in the form of a sheet that needs to be further processed to form individual pieces of the confectionery material containing product. Conventional forming of conventional products for panning typically results in individual pieces having a limited variety of geometric shapes such as round, square, or rectangular shapes. Product shapes for panning operations are limited by the tumbling and wetting actions that are involved in typical panning. In the present invention, no such limitations exist. Additionally, in some embodiments, the second moisture content of the dough-like material included in the intermediate product allows enough flexibility such that the intermediate product can be cut and manipulated to form a large variety of shapes. Thus, a variety of confectionery product-forming mechanisms including, but not limited to scoring dies, punching, stamping, molding and roller assemblies may be employed with the multi-region confection so that the individual pieces can be made in essentially any form, including geometric shapes (e.g., cube, triangle, hexagon, star, cylinder, twist shape, wavy shape, swirl shape and the like), shapes of living creatures (e.g., animals, birds, and the like), cartoon-type characters (e.g., Disney-owned characters), theme related icons (e.g., numbers, letters, scientific symbols, and the like). Due to the large variety and lack of shape limitations, product forms can include interlocking shapes such that the shapes interlock vertically (as in a stack) or horizontally (as in a puzzle). In some embodiments a suggestive shape such as a mint leaf that suggests mint flavor can be formed. The mint leaf shape can take the form of a single leaf with score lines similar to veins in a mint leaf A consumer can then break off individual pieces using the score lines. In other embodiments, a suggestive mint leaf shape can include multiple mint leaves attached to one another in a flat plane with score lines between the leaves such that a consumer snaps off a leaf to consume an individual piece.

Confectionery products with non-flat surfaces may also produced including products with embossed or debossed surfaces such as surfaces with indentations (e.g., dimples), holes, raised letters or shapes, and the like. In addition, confectionery products with raised surfaces may be produced such as egg shapes, and surfaces with continuous or non-continuous raised areas (e.g. wavy surface). In some embodiments, these raised surfaces can result in product pieces with dimpled pillow shapes and the like while in other embodiments, a wavy product resembling traditional ribbon candy can be formed. The confectionery products also include tape gums in which a flat sheet is rolled into a cylinder (spiral winding) and then transversely scored into individual spiral gum tape pieces.

The confectionery product forming mechanisms may be applied during a process of applying the dough-like confectionery material to the edible substrate and/or after the process before reducing the amount of water to the desired amount in the confectionery product.

Scoring dies may be used to create the atypical shapes described above, which are positioned downstream of the drying station. The scoring dies are preformed in a desired shape, and when placed into contact with a sheet of the confectionery material containing intermediate product, produce the individual pieces in the desired shape. The selection of suitable preformed dies for this purpose is within the skill of the art.

Another technique for forming irregular shaped confectionery products, including chewing gums, employs a set of rollers to define the three-dimensional shapes in the confectionery material containing intermediate or final product, as disclosed in U.S. Pat. No. 7,442,026, incorporated herein by reference.

Coextrusion can also be used to produce confectionery-material-containing product in which the substrate and the dough-like confectionery material are coextruded in a discontinuous process. In this aspect, the die portion providing the substrate material deposits the same in a discontinuous manner on a conveyor, followed by the application of the layering material sufficient to cover the individual deposits of the substrate. The resulting individual intermediate products are post-treated as described above (e.g., with short term drying or conditioning) to form a final product.

An alternative means of applying the dough-like confectionery material to the substrate is a system that applies pressure to the dough-like confectionery material at the time it is applied to the substrate. This system, including apparatus and method, is referred to herein as compressive lamination. This is a system by which the layering material is applied to the substrate utilizing a laminating device in the form of a roller assembly. The roller assembly includes spaced apart rollers, between which is placed the dough-like confectionery material. The spaced apart rollers, including a target roller and a secondary roller, are separated by a distance typically corresponding to the thickness of the desired layer or region. The target roller is the part of the roller assembly that applies the dough-like confectionery material to the substrate. As the dough-like confectionery material contacts the target and secondary rollers, it is compressed into the desired thickness, while at the same time maintaining contact with the target roller, so that the compressed layering material can be released onto the substrate from the target roller.

When the target roller applies the layering material to the substrate, it does so under a compressive force that preferentially adheres the layering material to the substrate, while simultaneously releasing the layering material from the target roller. The compressive force is generated by placing the target roller (with the layering material thereon) a distance from the substrate less than the combined thickness of the substrate and the layering material.

Figure 5:
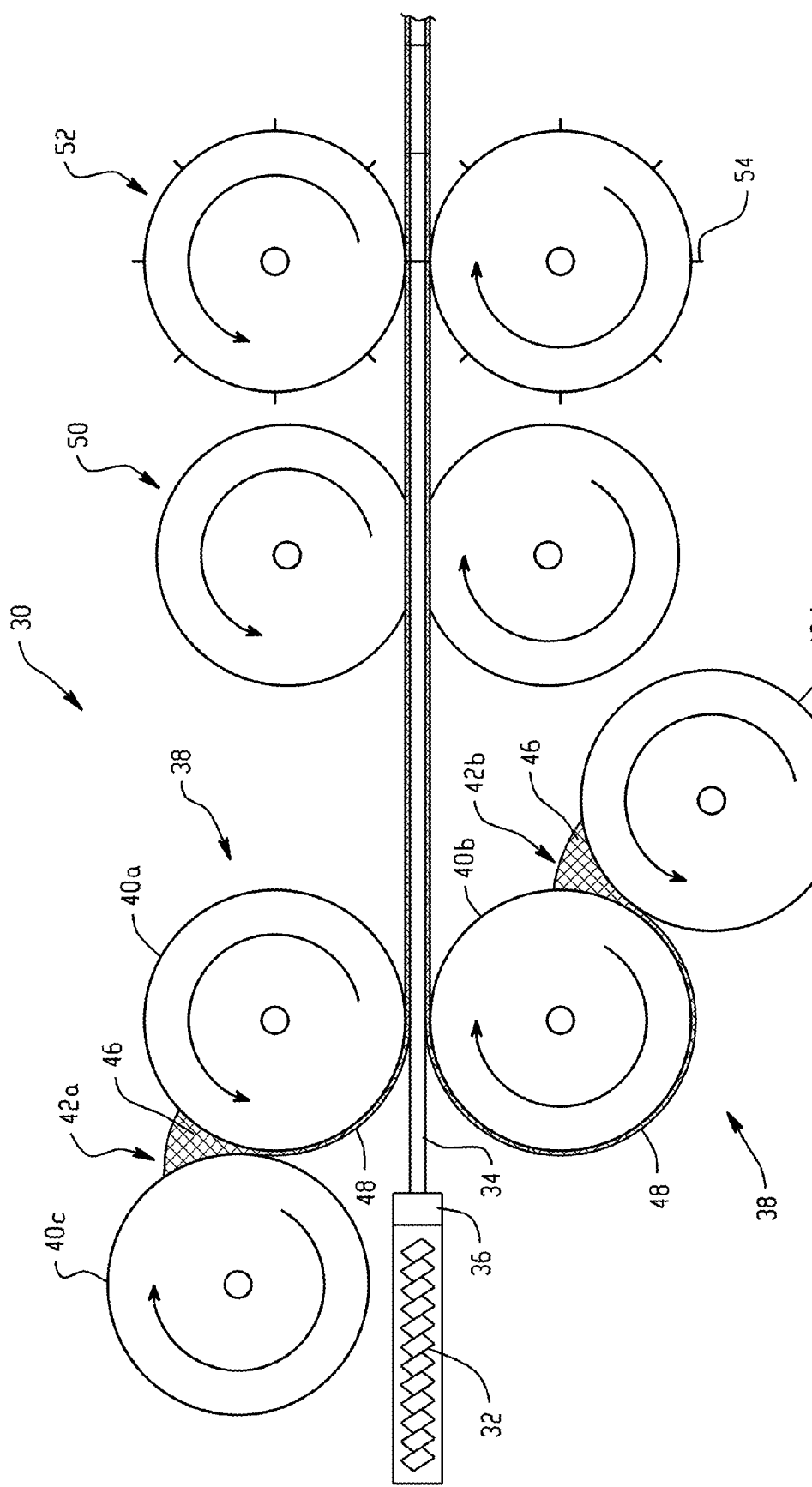
FIG. 5 is a diagrammatic view of an embodiment of a compressive lamination system for applying a layering material to an edible substrate.

Referring to FIG. 5, there is shown a compression lamination system 30 comprising an extruder 32 that forms a continuous band of an edible substrate 34 through a die 36. There is further disclosed a roller assembly 38 comprised of two pair of spaced apart opposed rotating rollers (40*a*, 40*b*) and (40*c*, 40*d*). Rollers 40*a* and 40*c* rotate in opposite directions. Roller 40*a* is referred to as a target roller, typically cylindrical and typically made of stainless steel, because its function is to apply the layering material to the substrate. The roller 40*c* is a secondary roller, whose purpose is to apply pressure on the coating material in proximity of the gap 42*a* to preferentially form a layer or region of layering material on the target roller 40*a*. The secondary roller is likewise typically cylindrical and typically made of stainless steel. Rollers 40*b* and 40*d* shown in FIG. 5 function in a similar manner, in which roller 40*b* is a target roller and roller 40*d* is a secondary roller.

There are gaps 42*a* and 42*b* between each pair of opposed rollers to which is supplied the layering material or dough-like confectionery material 46. The layering material 46 preferentially adheres to rollers 40*a* and 40*b*, so that a relatively thin layer 48 of the layering material adheres to each target roller 40*a* and 40*b*, as it comes in contact with the substrate. Adherence of the layering material to the target roller can be controlled by adjusting the size of the gap, the speed of the target roller and the secondary roller, the pressure exerted on the dough-like confectionery material in proximity of the gap, and the viscosity of the dough-like confectionery material.

As previously indicated, the layering material has sufficient stickiness so that it adheres to the target roller, but not so much stickiness that the layering material remains with the target roller after contact with the substrate. The relative amount of stickiness can be adjusted as previously described, such as by modifying the amount of solid particulate and/or the diffusion controller when formulating in the dough-like confectionery material.

Although not preferred, a minor amount of the layering material (i.e., "excess layering material") may remain on the target roller after contact with the substrate. The excess material may be removed by a stationary scraper (not shown) or by periodically stopping the roller assembly and cleaning the rollers.

The formulation of the layering material is carried out as previously described, so that the layering material preferentially adheres to the target rollers 40a and 40b, enabling the layering material to contact the substrate. The substrate passes between the target rollers 40a, 40b so that when the layering material makes contact with the substrate, the layering material is released from the target rollers and placed upon the substrate. As the target rollers continue to rotate, a portion of the target rollers that has released the layering material is free to pick up more layering material at the gap (42a or 42b), thereby creating a continuous process for placing the layering material on the substrate. The layering material may be continuously supplied from a source (not shown) to the gap and may also include recycled "trim" material as previously described.

The gap between the rotating rollers of the first pair of rollers can vary in distance, depending on the desired thickness of the layering material to be applied to the substrate. The pressure applied to the layering material by having the dough-like confectionery material compressed between the rollers not only assists in preferentially adhering the layering material to the target roller, but also urges the liquid phase (i.e., liquid and diffusion controller) to fill the voids between the individual solid particulates. In some embodiments, further pressure is applied when the target roller releases the layering material onto the substrate as previously described.

When laminating the layering material onto the substrate, there are considerations, discussed below, which facilitate achieving a desirable result. The first is the formulation of the layering material (dough-like confectionery material itself). The more viscous the layering material, the larger the gap that may be selected for the pair of opposed rotating rollers, and the thicker the layer or region that may be applied. Generally, there are commercial limits to the thickness of the layer or region, and the nature of the final product factors into the selection of a proper ratio of viscous modulus to elastic modulus (e.g. Tan delta value) of the layering material, and the gap between the rollers, to achieve the desired thickness. In general, the Tan delta value can vary over a wide range (e.g. Tan delta value of up to 1.5), providing the layering material can a) preferentially adhere to the target roller, and b) be released from the target roller to the substrate.

The desirability of preferentially retaining the layering material on the target roller is an important consideration. It is preferred to have most, most preferably substantially all, of the layering material retained on the target roller. If too much layering material is retained on the secondary roller, it may be necessary to provide a scraper or other system for removing excess layering material from the secondary roller, as previously described. Furthermore, if the secondary roller retains layering material, the thickness of the layering material on the target roller may vary and can result in inconsistent thicknesses of layering material on the substrate.

When pressure is applied to the layering material at the gap by the secondary roller as it is applied to the target roller, the liquid phase (liquid and diffusion controller) contained within the layering material tends to become interspersed and surround the solid particulate as the result of the breakdown of surface tension within the layering material. Uniformly dispersing the liquid phase between individual solid particulates enhances the likelihood that the water or the liquid (e.g., water) can be removed under mild conditions, such as room temperature, and drying can be conducted for no more than short periods of time, or can be removed solely by conditioning at room temperature and low humidity without drying.

In the embodiment shown in FIG. 5, two pairs of rotating rollers (each including a target roller and a secondary roller) are employed to apply the layering material to the top and the bottom surfaces of the substrate. One of the pair of rotating rollers may be removed from the system if only one surface of the substrate is to receive the layering material. In addition, scoring dies may be used to score the sheets of the confectionery-material-containing product into individual pieces having a variety of shapes as previously described.

The layering material maintains the solid particulates by surrounding the same with the diffusion controller which eventually hardens to provide a layer or region that may afford a "crunch sensation." However, layers without a crunch sensation are also obtainable.

Referring again to FIG. 5, once the layering material is applied by compressive lamination to the substrate, the sheet of the confectionery material containing intermediate product can then be processed into individual pieces of final product. This may be accomplished by lengthwise scoring through a pair of scoring rollers, depicted by the numeral 50, and/or further processed by sidewise scoring by a pair of rotating rollers 52 in which cutters 54 cut the sheet into individual pieces of the desired product.

As previously indicated, a short-term drying step or a conditioning step can be employed, but is not required. Short-term drying is desired if the confectionery-material-containing product is to exhibit a crunch sensation. Short-term drying can be carried out in the time it takes the sheet to travel from the compressive lamination station to the initial scoring station, as shown in FIG. 5. The short-term drying can last for just a few seconds, typically less than two seconds at ambient temperature or slightly elevated temperatures. The drying temperature may be raised slightly above ambient conditions, if necessary. However, extended drying times associated with conventional hard panning at elevated temperatures can be eliminated.

Figure 6:
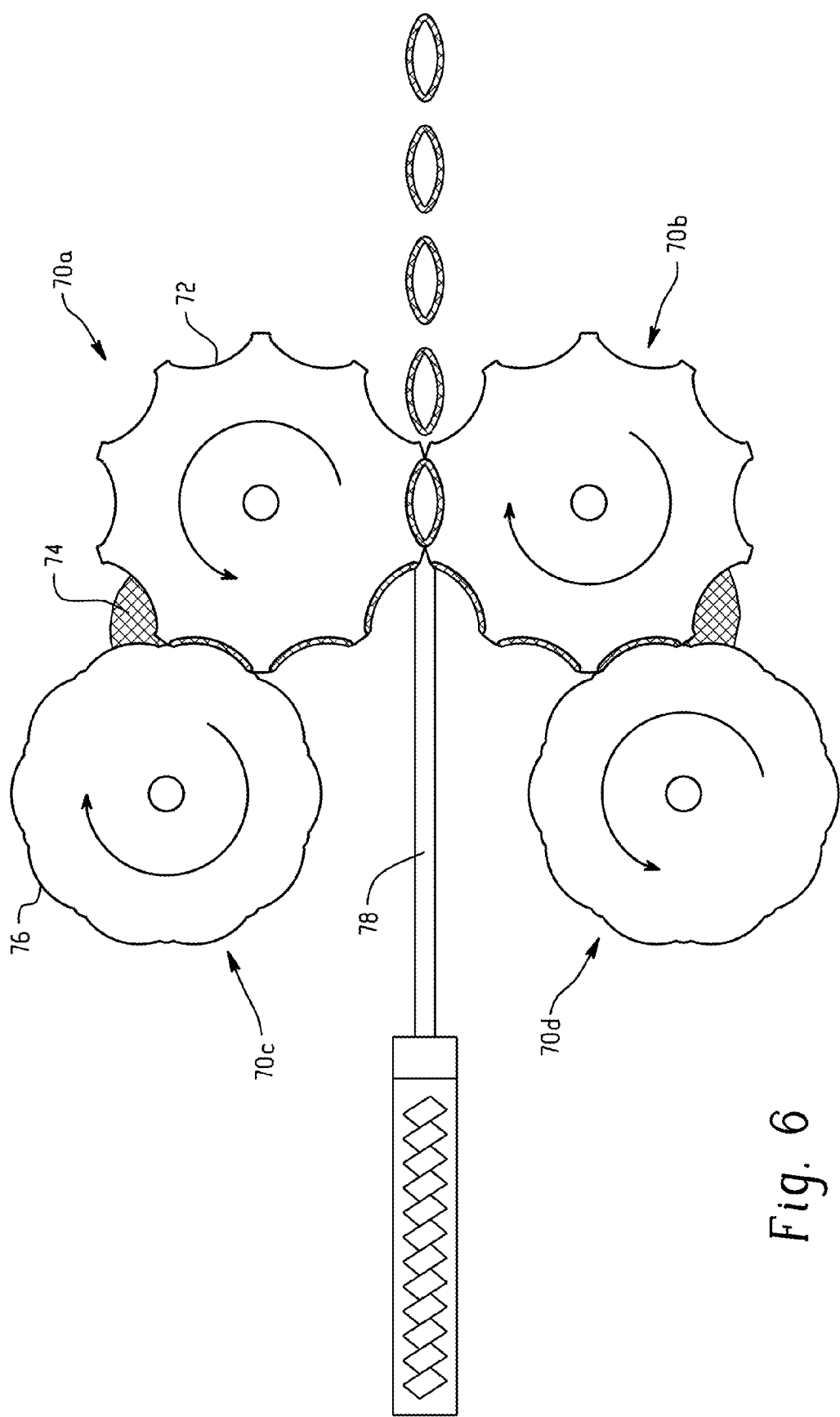
FIG. 6 is a diagrammatic view of another embodiment of a compressive lamination system for applying a layering material to the substrate.

Referring to FIG. 6, there is shown an embodiment of a compressive lamination assembly, similar to FIG. 5, except that the opposed rollers of the rotating assembly are provided with semi-cavities, so that the layering material lines the semi-cavities. When opposing semi-cavities come together, the final product is formed without the need for a separate scoring station. More specifically, opposed target rollers 70a and 70b are provided with semi-cavities 72 that are adapted to receive the layering material (dough-like confectionery material) 74. The layering material is provided by the secondary roller 70c and 70d, which have mating projections 76 that fit within the semi-cavities of each of the target rollers to force the dough-like confectionery material within the semi-cavities 74, and line the same with the layering material. When the rotating rollers with lined semi-cavities come together, the edible core 78 passes therebetween and fills the remaining portions of the lined cavities, so that individual products are released therefrom.

The lining of the target rollers with the layering material requires that the dough-like confectionery material be retained within the semi-cavities and then bound to the substrate while being released by the semi-cavities. The same considerations that go into the formulation of the dough-like confectionery material in the embodiment shown in FIG. 5, apply to the embodiment shown in FIG. 6. The dough-like confectionery material is viscous to enable it to preferentially stick to the semi-cavity, while the layering material-lined semi-cavities are released by the projections of the secondary rollers. At the same time, while the layering material-lined semi-cavities come into contact with the substrate, the layering material adheres to the substrate and is released from the semi-cavities. It will be understood that the semi-cavities may together form any shape described in connection with the embodiment of FIG. 6, by designing each complimentary semi-cavity to conform to the desired shape of the final product.

The product may be produced in a manner that elicits an individual particular or more complex sensory perception in a consumer. The products may be provided with a signature sensory label that the consumer responds to with a sensory perception. For example, a product may have a signature sensory label in the form of a color, a surface topography, a shape and/or aroma. When the consumer sees the product with a particular signature sensory label, the consumer immediately associates the product with a particular sensory and/or functional benefit.

For example, a confectionery product with an oral care benefit could include a signature aroma associated with the oral care functional benefit. As used herein, a "signature aroma providing substance" is an aroma providing substance that provides an aroma profile created to communicate or otherwise indicate or represent a product benefit other than the product's taste or flavor profile. The signature aroma provided by the signature aroma providing substance provides the user with a cue that the product will provide the oral care functional benefit experience at least several seconds before beginning to eat the product and receive the oral care functional benefit.

The signature aroma could be a floral aroma created to signal mouth freshening. The user would receive the floral mouth freshening cue before consuming the product and would expect the mouth freshening benefit independent of the product flavor profile that could be fruit, mint, spice, etc. When the signature aroma providing substance is located on at least one exterior surface of the product, the signature aroma would be transferred to the user's hand(s) when the user handles the product and thus the user would be reminded of the mouth freshening benefit.

In addition to signature aromas, signature shapes, signature surface topographies and signature colors and combinations thereof can be used. It should further be noted that edible substrates having multiple sides or multiple distinct areas can be coated with different dough-like confectionery materials, each containing a different color or active agents (e.g. sensate agents such as sweet and sour, hot and cold, etc) and/or different shapes and surface topographies. Still further, the multiple sides or multiple distinct areas may be provided with different hardness coating materials ranging from soft to hard including crunchy.

Also included are products with unique texture profiles. For example, the process of applying the dough-like confectionery material to the edible substrate can provide a spaced-apart region of hard confectionery material and soft confectionery material and a consumer can experience a unique chewing experience when a product is first chewed due to the concurrent sensation of both hard and soft confectionery materials.

The strength of the layer or region formed from dough-like confectionery material in a finished product can be fortified by adding dough-strengthening agents to the dough-like confectionery material. Such agents include nanoclay as disclosed in U.S. Patent Publication No. 2007/0218165 A1 incorporated herein by reference. Other dough strengthening agents include silicates such as magnesium and aluminum silicate, clay, bentonite, calcium carbonate di- and tri-calcium phosphate, titanium dioxide, alumina, mica-based pearlescent pigments, zinc oxide, talc, aluminum benzoate, cellulose, fiber, and combinations thereof. These materials may also reduce chipping and/or increase crunchiness of the layer or region.

The width of the sheet formed from the application of the dough-like confectionery material on the edible substrate may vary depending on the apparatus used. The sheet can be treated by the previously mentioned shape forming mechanisms including, but not limited to scoring dies, punching, stamping, molding, and roller assemblies into individual pieces. The sheet can be first cut into individual pieces and then shaped or can be first shaped and then be cut into individual pieces, or cutting and shaping can be formed simultaneously. Apparatus systems used for these purposes include chain die, rotary die, roller and scoring, cutting and wrapping. One such shaping apparatus is a bowl-forming machine.

The apparatus provides a further advantage enabling the processing of relatively wide sheets formed from the application of the dough-like confectionery material on the substrate before the conditioning step. Accordingly, the wide sheet allows operation at slower process speeds through the conditioning tunnel to avoid having the confectionery product travel through the tunnel multiple times.

Any confectionery surface treatment including, but not limited to, printing, imaging, glazing, glossing, smoothing, filming, lacquering, frosting, polishing, dusting, toasting, and the like can be applied to the sheet before and/or after drying. Color ingredients such as dyes, lakes and mica-plated pigments such as pearlescent pigments can be used to create a great variety of visual effects. The confectionery region can be readily surface treated so that the final product may be in the form of a flat sheet with an image printed thereon and scored so that the image is divided among the individual pieces. When the individual pieces have an irregular shape, the final product resembles a completed jigsaw puzzle. In addition, the package containing the final product may have a transparent covering to enable the prospective purchaser to see the final product with the printed image through the covering. The printed image can include any image that may be printed on the final product, including complex images such as movie and cartoon characters.

The confectionery-material-containing product described herein may be provided with one or more protective coatings. For example, a coating may be provided to protect the product from "sweating" that may occur in high temperature, high humidity climates. In addition, protective coatings may be applied to protect the dough-like confectionery material from undesirable physical or atmospheric conditions.

The dough-like confectionery material can be used to coat a variety of substrates and to thereby produce a variety of different gum products having varying shapes, textures, coating thickness and flavors. The shapes of the gum products are unlimited but includes, for example, block, slab, square, cube, and stick shaped gums with and without unique design elements associated therewith. The texture of the gum can also vary and includes, but is not limited to soft gums, bubble gums, candy/gum combinations and fat based soft gums.

In addition, dough-like confectionery material can be used to form coatings having a broad range of hardness and crunchiness ratings. Furthermore, the dough-like confectionery material can be applied as a single coating layer up to and exceeding several coating layers with each layer having the same or different hardness and/or crunchiness. In some embodiments, the amount of the coating, whether in a single or multiple layers will be in the range of 20 to 40% by weight based on the total weight of the confectionery material containing product.

Specific embodiments of the dough-like confectionery material, chewing gum confectioneries incorporating the dough-like confectionery material, non-chewing gum (candy) confectioneries incorporating the dough-like confectionery material, and diffusion controller sols used to prepare the dough-like confectionery material are described below.

Particular Embodiments of the Dough-Like Confectionery Material and the Diffusion Controller Sol One embodiment is a dough-like confectionery composition comprising a solid phase and a liquid phase. At least a major portion of the solid phase is surrounded by the liquid phase. The solid phase comprises a solid particulate. The solid particulate can be in the form of granules, powders, aggregates, crystals, non-crystalline solids, or a combination or two or more of the foregoing forms. The liquid phase comprises a mixture of a liquid and a diffusion controller. In some embodiments, the solid particulate has an average particle size of about 1 to about 500 micrometers. Within this range, the average particle size can be at least 5 micrometers, or at least 10 micrometers, or at least 20 micrometers, or at least 50 micrometers. Also within this range, the average particle size can be up to 400 micrometers, or up to 300 micrometers, or up to 250 micrometers, or up to 200 micrometers, or up to 150 micrometers, or up to 100 micrometers, or up to 50 micrometers. In some embodiments, the solid particulate has a bimodal particle size distribution comprising a first particle size of about 100 to about 300 micrometers and a second particle size of about 20 to about 80 micrometers. The liquid and the diffusion controller are typically present in amounts sufficient to collectively form a viscous material capable of surrounding the solid particulate. The viscous material has a viscosity greater than the liquid itself. After the dough-like confectionery composition is formed into a confectionery layer or region, a portion of the liquid is typically removed, either actively (e.g., via a heating or drying step) or passively (e.g., via a period of exposure to ambient conditions). The resulting confectionery layer or region from which a portion of the liquid has been removed can be hard or soft, depending on its initial composition and process history.

In a preferred embodiment, the solid particulate is selected from sugars, sugar alcohols, and mixtures thereof. Particularly preferred are sugars and sugar alcohols having a water solubility of about 140 to about 200 grams per 100 grams water at 25° C. Such sugars and sugar alcohols include, for example, some polyglycitol powders, maltitol, xylitol, lactitol monohydrate, and sucrose.

A variety of liquids can be used to form the dough-like confectionery composition. These include water, glycerin, hydrogenated starch hydrolysates, polyol syrups, and mixtures thereof. The liquid is typically present in an amount of up to about 20% by weight, specifically about 2 to about 16% by weight, more specifically about 4 to about 12% by weight, based on the weight of the dough-like confectionery composition. It should be noted that these liquid amounts correspond to added liquid and do not include the small amounts of liquid (e.g., water) that may be associated with the diffusion controller and the solid particulates.

The diffusion controller typically has a molecular weight of at least about 50,000 daltons. Suitable diffusion controllers include, for example, xanthan gum, carboxymethyl cellulose, methyl cellulose, hydroxypropylmethyl cellulose, starch, modified starches, inulin, konjac, chitosan, tragacanth, karaya, ghatti, larch, carageenan, alginate, chemically modified alginate, agar, guar, locust bean, *psyllium*, tara, gellan, curdlan, pullan, gum arabic, gelatin, and pectin, as well as mixtures thereof. In some embodiments, the diffusion controller comprises xanthan gum, carboxymethyl cellulose, alginate, or a mixture thereof. In some embodiments, the diffusion controller comprises xanthan gum. In some embodiments, the diffusion controller comprises carboxymethyl cellulose. In some embodiments, the diffusion controller comprises alginate.

The diffusion controller can be present in an amount of about 1 to 25% by weight, specifically about 2 to about 10% by weight, more specifically about 3 to about 5% by weight, based on the weight of the dough-like confectionery composition. In some embodiments, the diffusion controller is present in an amount of about 20% to about 55% by weight, based on the weight of the liquid phase.

In addition to the liquid and the diffusion controller, the dough-like confectionery composition can, optionally, further comprise an osmotic pressure controller. While not wishing to be bound by any particular theory of operation, the present inventors hypothesize that the osmotic pressure controller dissolves in the liquid and helps to control the rate and extent of dissolution of the solid particulate in the dough-like confectionery composition. Suitable osmotic pressure controllers include dextrans, and carbohydrates having a molecular weight of less than about 2,000. In some embodiments, the osmotic pressure controller is a sugar alcohol. In some embodiments, the osmotic pressure controller comprises dissolved maltitol. The term "dissolved maltitol" is used to distinguish any solid maltitol that may be present as a solid particulate.

In some embodiments of the dough-like confectionery composition, the solid particulate is present in an amount of about 50 to about 95% by weight, the liquid in an amount of about 4 to about 12% by weight, and the diffusion controller in an amount of about 1 to 12% by weight, specifically about 2 to about 10% by weight, based on the weight of the dough-like confectionery composition.

In some embodiments of the dough-like confectionery composition, the liquid comprises or consists of water, and the diffusion controller comprises or consists of xanthan gum. In such embodiments, the water can be present in an amount of about 7 to about 11% by weight, based on the weight of the dough-like confectionery composition. Also, the xanthan gum can be present in an amount of about 3 to 5% by weight based on the weight of the dough-like confectionery composition. The weight ratio of water to xanthan gum can be about 1.5:1 to about 2.5:1. In some embodiments, the xanthan gum is present in an amount of about 20% to about 55% by weight based on the weight of the liquid phase.

In the dough-like confectionery composition, the liquid phase components are typically present in an amount of about 5 to 50% by weight, and the solid phase components are typically present in an amount of about 50 to 95% by weight, based on the combined weight of the liquid phase and the solid phase components. The weight ratio of the liquid phase to the solid phase can be about 0.1:1 to about 0.15:1. In some embodiments, the liquid phase components comprise the liquid in an amount of about 4 to about 12% by weight and the diffusion controller in an amount of about 2 to about 10% by weight, and further comprise an osmotic pressure controller in an amount of about 1 to about 25% by weight, based on the combined weight of the liquid phase and the solid phase components. In some embodiments, the weight ratio of liquid to diffusion controller is about 1.5:1 to about 2.5:1.

The dough-like confectionery composition is typically sweet. Its sweetness is derived primarily from the solid particulate and secondarily from any osmotic pressure controller present. When additional sweetness is desirable, the dough-like confectionery composition can further comprise an intense sweetener. The intense sweetener can reside in the solid phase, the liquid phase, or both. Various intense sweeteners and amounts are described above.

The dough-like confectionery composition can also optionally further comprise an effective amount of at least one active agent. Various active agents are described above and include, for example, flavor agents, sensate agents, coloring agents, demulcents, and functional agents, including breath freshening agents, dental care agents, pharmaceutical agents, vitamins, minerals, nutraceuticals, and the like, and combinations thereof. Because the dough-like confectionery composition can be prepared at or near room temperature, it is particularly suitable for incorporation of active agents that are volatile, heat sensitive, or water-reactive. Such agents include certain flavor agents, certain sugar alcohols (e.g., xylitol), and food-grade acids. One advantage is the ability to use reduced amounts of heat and/or moisture sensitive agents.

The dough-like confectionery composition has a dough-like consistency. For example, it typically has sufficient flexibility to be placed onto a rotating roller and released therefrom onto a substrate. In some embodiments, the dough-like confectionery composition is pseudoplastic (e.g., at 23° C.). As described above, when a force is applied to a pseudoplastic material, the material reacts by exhibiting a counteractive force. More specifically, the material pushes back against the force and seeks to return to its original shape. Pseudoplastic materials instantaneously decrease in viscosity when a shear stress rate is increased. In some embodiments the dough-like confectionery composition exhibits a Tan Delta value of less than about 1.5 (e.g., at 23° C.). Tan Delta is the ratio of viscous modulus to elastic modulus and a useful quantifier of the presence and extent of elasticity in a fluid. The higher the Tan Delta value, the less elastic the viscoelastic liquid. In some embodiments, the Tan Delta value is less than about 1.2, specifically about 0.2 to about 0.8. In some embodiments, the dough-like confectionery composition exhibits a flow behavior index (n) of about 0.65 to about 0.85. Procedures for measuring rheological properties of the confectionery composition are described in the working examples.

The dough-like confectionery composition can, optionally, exclude certain components. For example, it can be free of gelatin and/or free of plasticizer and/or free of polyol syrup.

In a preferred embodiment, the dough-like confectionery composition comprises about 76 to about 92% by weight of the solid particulate, about 4 to about 12% by weight of the liquid, about 2 to about 10% by weight of the diffusion controller, and about 2 to about 10% by weight of an osmotic pressure controller, wherein all percents by weight are based on the weight of the dough-like confectionery composition. In this embodiment, the solid particulate comprises solid maltitol, the liquid comprises water, the diffusion controller comprises xanthan gum, and the osmotic pressure controller comprises dissolved maltitol.

One embodiment is a confectionery composition, comprising: about 76 to about 94% by weight of maltitol, about 4 to about 12% by weight of water, and about 2 to about 10% by weight of xanthan gum, wherein all percent by weight values are based on the total weight of the confectionery composition.

The invention extends to methods of preparing the dough-like confectionery composition. Thus, one embodiment is a method of preparing a confectionery composition, comprising: blending about 76 to about 94% by weight of a solid particulate, and about 6 to about 24% by weight of a diffusion controller sol, the diffusion controller comprising about 4 to about 12% by weight of a liquid, and about 2 to about 12% by weight of a diffusion controller, wherein all weight percents are based on the total weight of the confectionery composition. The diffusion controller sol is preferably essentially homogeneous. One advantage of the present confectionery composition is that it can be prepared at ambient temperature. As used herein, the terms "ambient temperature" and "room temperature" are synonymous and refer to a temperature of about 15° C. to about 30° C., specifically about 18° C. to about 27° C. Ambient temperature blending can be used both for preparation of the diffusion controller sol and for blending of the solid particulate with the diffusion controller sol. In a preferred embodiment of the method, the solid particulate comprises maltitol, the liquid comprises water, and the diffusion controller comprises xanthan gum.

The invention extends to confectionery layers or regions derived from the dough-like confectionery composition. Thus, one embodiment is a multi-region confection comprising at least one confectionery layer or region comprising a plurality of solid particulates with at least a major portion of the plurality of solid particulates at least partially surrounded by a hardened diffusion controller. In some embodiments, the solid particulates are selected from sugars and sugar alcohols. In some embodiments, the at least one confectionery layer or region has a thickness of at least 0.2 millimeter. In some embodiments, the at least one confectionery layer or region further comprises a plasticizer in an amount of about 1 to about 30% by weight, based on the total weight of the at least one confectionery layer or region. In some embodiments, the multi-region confection exhibits a crunch sensation when chewed. In some embodiments, the diffusion controller is selected from the group consisting of xanthan gum, carboxymethyl cellulose, methyl cellulose, hydroxypropylmethyl cellulose, starch, modified starches, inulin, konjac, chitosan, tragacanth, karaya, ghatti, larch, carageenan, alginate, chemically modified alginate, agar, guar, locust bean, *psyllium*, tara, gellan, curdlan, pullan, gum arabic, gelatin, and pectin, and mixtures thereof. In some embodiments, the liquid is selected from the group consisting of water, glycerin, hydrogenated starch hydrolysates, and mixtures thereof. In some embodiments, the at least one confectionery layer or region further comprises an osmotic pressure controller. The osmotic pressure controller is soluble in the liquid. Suitable osmotic pressure controllers include, for example, carbohydrates having a molecular weight of less than about 2,000 and dextrans. In some embodiments, the osmotic pressure controller is a sugar alcohol. In some embodiments, the osmotic pressure controller comprises maltitol. In a very specific embodiment of the multi-region confection, the at least one confectionery layer or region comprises about 20 to about 98% by weight of the solid particulates, and about 2 to about 20% by weight of the diffusion controller, wherein all percents by weight are based on the weight of the at least one confectionery layer or region; and the solid particulates comprise solid maltitol, and the diffusion controller comprises xanthan gum.

The compositions of the confectionery layers or regions typically comprise less liquid than the dough-like confectionery compositions from which they are derived, the liquid content having been reduced by evaporation and/or exudation under pressure. This loss of liquid is accompanied by an at least partial hardening of the composition, and the diffusion controller of the confectionery layer or region can therefore be said to have "hardened" relative to the diffusion controller of dough-like composition. However, it is not clear that there is any chemical difference between the diffusion controller and the hardened diffusion controller.

All of the variations in component types and amounts described above for the dough-like confectionery composition apply equally to the confectionery layer or region, with the exception that amount the liquid (and any other volatile components) may have been reduced in the confectionery layer or region relative to the dough-like confectionery composition.

Due to handling constraints on the dough-like confectionery composition, the confectionery layer or region typically has a thickness of at least 0.2 millimeter. The range of layer or region thickness can be, for example, about 0.2 to about 5 millimeters, specifically about 0.3 to about 4 millimeters, more specifically about 0.4 to about 3 millimeters, still more specifically about 0.5 to about 2 millimeters, yet more specifically about 0.5 to about 1 millimeter. The confectionery layer or region can be soft or hard, depending on its composition. Suitable compositions for soft and hard layers and regions are provided in the working examples below. When the confectionery layer or region is soft, it can stretch when a stretch inducing force is applied. In some embodiments, soft confectionery regions or layers are obtained when a plasticizer is incorporated into the confectionery layer or region in an amount of about 1 to about 30% by weight, based on the total weight of the confectionery layer or region. When desired, the confectionery layer or region can be brittle, breaking when a break inducing force is applied. The brittleness of the confectionery layer or region can also be manifested as a crunch sensation when the confectionery layer or region is chewed.

In some embodiments, the confectionery layer or region comprises about 20 to about 98% by weight of the solid particulate, and about 2 to about 20% by weight of the diffusion controller, based on the weight of the confectionery layer or region. In these embodiments, the solid particulate comprises solid maltitol, and the diffusion controller comprises xanthan gum.

One embodiment is a confectionery layer or region comprising about 20 to about 98% by weight of maltitol, and about 2 to about 20% by weight of xanthan gum. In some embodiments, the confectionery layer or region comprises less than or equal to 5% by weight of water, specifically about 0.5 to about 5% by weight of water, based on the weight of the confectionery layer or region. Water content typically co-varies with softness, higher water contents being associated with softer compositions.

One embodiment is a confectionery layer or region comprising about 76 to about 94% by weight of solid particulates, and about 6 to about 24% by weight of a diffusion controller sol, the diffusion controller sol comprising about 4 to about 12% by weight of a liquid, and about 2 to about 12% by weight of a diffusion controller, wherein all weight percents are based on the total weight of the confectionery layer or region; and wherein the confectionery layer or region has a first moisture content before processing, a second moisture content during processing, and a third moisture content after processing. In some embodiments, the first moisture content is about 8% to about 15% and the second moisture content is about 4% to about 6% and the third moisture content is less than 2%, wherein all weight percents are based on the total weight of the confectionery layer or region.

Some embodiments relate to the diffusion controller sol used to form the confectionery composition. For example, one embodiment is a method of forming a diffusion controller sol, comprising blending about 20 to about 55% by weight of a diffusion controller selected from the group consisting of xanthan gum, carboxymethyl cellulose, alginate, and combinations thereof, and about 45 to about 80% by weight of a liquid to form the diffusion controller sol, wherein all percent by weight values are based on the total weight of the diffusion controller sol. Within the range of about 20 to about 55% by weight, the diffusion controller amount can be at least about 25% by weight or at least about 30% by weight or at least about 35% by weight. Also within the range of about 20 to about 55% by weight, the diffusion controller amount can be up to about 50% by weight or up to about 45% by weight or up to about 40% by weight. Within the range of about 45 to about 80% by weight, the liquid amount can be at least about 50% by weight, or at least about 55% by weight, or at least about 60% by weight. Also within the range of about 45 to about 80% by weight, the liquid amount can be up to about 75% by weight, or up to about 70% by weight, or up to about 65% by weight. In some embodiments, the diffusion controller is xanthan gum. In some embodiments, the liquid is selected from the group consisting of water, glycerin, hydrogenated starch hydrolysates, and mixtures thereof. The blending step can comprise gradually adding the diffusion controller to the liquid. Alternatively or in addition, the blending step can comprise processing the diffusion controller and the liquid in a twin-screw extruder. In some embodiments, the diffusion controller sol consists of xanthan gum and water. One advantage of the present diffusion controller sols is that they can be prepared at ambient temperature. Thus, in some embodiments, the blending is conducted at a temperature of about 15 to about 30° C. In some embodiments, the diffusion controller sol is essentially homogeneous, which means that it is free of any lumps larger than the thickness of the confectionery layer or region into which it is incorporated.

One embodiment is a diffusion controller sol, comprising about 20 to about 55% by weight of a diffusion controller selected from the group consisting of xanthan gum, carboxymethyl cellulose, alginate, and combinations thereof, and about 45 to about 80% by weight of a liquid; wherein all percent by weight values are based on the total weight of the diffusion controller sol. Within the range of about 20 to about 55% by weight, the diffusion controller amount can be at least about 25% by weight or at least about 30% by weight or at least about 35% by weight. Also within the range of about 20 to about 55% by weight, the diffusion controller amount can be up to about 50% by weight or up to about 45% by weight or up to about 40% by weight. Within the range of about 45 to about 80% by weight, the liquid amount can be at least about 50% by weight, or at least about 55% by weight, or at least about 60% by weight. Also within the range of about 45 to about 80% by weight, the liquid amount can be up to about 75% by weight, or up to about 70% by weight, or up to about 65% by weight. In some embodiments, the diffusion controller is xanthan gum. In some embodiments, the liquid is selected from the group consisting of water, glycerin, hydrogenated starch hydrolysates, and mixtures thereof. In some embodiments, the diffusion controller sol consists of xanthan gum and water. In some embodiments, the diffusion controller sol is essentially homogeneous, which means that it is free of any lumps larger than the thickness of the confectionery layer or region into which it is incorporated.

Particular Embodiments of the Chewing Gum Confection

One embodiment is a multi-region chewing gum confection comprising: a) a first region comprising a chewing gum composition; and b) a second region comprising a confectionery composition comprising a solid phase and a liquid phase, at least a major portion of the solid phase being surrounded by the liquid phase, the solid phase comprising a plurality of solid particulates, and the liquid phase comprising a mixture of a liquid and a diffusion controller. In some embodiments, the solid particulate has an average particle size of about 1 to about 500 micrometers. Within this range, the average particle size can be at least 5 micrometers, or at least 10 micrometers, or at least 20 micrometers, or at least 50 micrometers. Also within this range, the average particle size can be up to 400 micrometers, or up to 300 micrometers, or up to 250 micrometers, or up to 200 micrometers, or up to 150 micrometers, or up to 100 micrometers, or up to 50 micrometers. In some embodiments, the solid particulate has a bimodal particle size distribution comprising a first particle size of about 100 to about 300 micrometers and a second particle size of about 20 to about 80 micrometers.

It is possible to have various spatial relationships between the edible substrate and the confectionery layer or region. For example, when the chewing gum confection is in the form of a stick or a tape, the confectionery layer can be in contact with one major face of the edible substrate, in contact with both major faces of the edible substrate, completely enveloping the edible substrate, or present as a layer between two layers of edible substrate. As another example, when the chewing gum confection is in the form of pillow-shaped, hard-coated gum piece, then the confectionery layer can be in contact with one major face of an edible gum core, in contact with two major faces of the edible gum core, completely enveloping an edible gum core, or present as a core surrounded by an edible gum layer. Any of these variations can, optionally, further comprise additional confectionery layers or regions, including hard and soft panned coatings, and hard and soft confectionery compositions. Any of these variations can also, optionally, comprise at least two of the confectionery layer or regions having the same or different compositions. While the above variations include contact between the confectionery layer or region and the edible substrate, it is also possible for the chewing gum confection to have one or more intermediate layers separating the confectionery layer or region and the edible substrate. Also, there is no particular limit on the shape of the chewing gum confection, with suitable shapes including sticks, tapes, cubes, pillows, cylinders, wavy shapes, triangular prisms, rectangular prisms, suggestive shapes (such as mint leaves, fruit shapes, etc.), and the like.

In some embodiments, the first region is selected from the group consisting of chewing gum, bubble gum, fat-based gum, candy gum, soft gums which turn hard or remain soft after chewing, and combinations thereof.

The multi-region confection can, optionally, further comprise a third region that is the same as one of the first region or the second region. In some embodiments, the multi-region chewing gum confection further comprises a third region that is different than at least one of the first region or the second region. In some embodiments, the second region at least partially surrounds the first region. In some embodiments, the second region forms an exterior surface of the multi-region chewing gum confection.

One embodiment is a multi-region chewing gum confection comprising: a) a first, confectionery region comprising about 76 to about 94% by weight of solid particulates, and about 6 to about 24% by weight of a diffusion controller sol, the diffusion controller sol comprising about 4 to about 12% by weight of a liquid, and about 2 to about 12% by weight of a diffusion controller, wherein all weight percents are based on the total weight of the first, confectionery region and wherein the first, confectionery region has a first moisture content before processing, a second moisture content during processing, and a third moisture content after processing; and b) a second, chewing gum region comprising a chewing gum composition. In some embodiments, the first moisture content is about 8% to about 15% and the second moisture content is about 4% to about 6% and the third moisture content is less than 2% wherein all weight percents are based on the total weight of the first, confectionery region. In some embodiments, the solid particulates comprise maltitol, the diffusion controller comprises xanthan gum, and the liquid comprises water. In some embodiments, the solid particulates are uniformly dispersed throughout the confectionery layer. In some embodiments, the confectionery layer is substantially free of air bubbles. In some embodiments, the multi-region chewing gum confection comprises a single first, confectionery region.

All of the variations in component types and amounts described above for the dough-like confectionery composition apply to the confectionery layer or region of the chewing gum confection, with the exception that amount the liquid (and any other volatile components) may have been reduced in the confectionery layer or region relative to the dough-like confectionery composition.

The present inventors have observed that an intentionally hard and crunchy confectionery layer or region can soften over time when in contact with a chewing gum composition comprising glycerin. While not wishing to be found by any particular explanation, the inventors hypothesize that the glycerin can migrate from the gum composition to the confectionery composition, where it exerts a plasticizing effect. Therefore, when a hard and/or crunchy confectionery layer or region is desirable, it is preferred to utilize a chewing gum composition comprising a glycerin amount of less than 5% by weight, specifically less than 3% by weight, more specifically less than 1% by weight, still more specifically 0% by weight, based on the weight of the chewing gum composition.

In a preferred embodiment of the chewing gum confection, the confectionery layer or region comprises about 50 to about 98% by weight of the solid particulate, and about 2 to about 20% by weight of the hardened diffusion controller, wherein all percent by weight values are based on the total weight of the confectionery layer or region. In the same embodiment, the solid particulate comprises maltitol, and the hardened diffusion controller comprises xanthan gum.

One embodiment is a chewing gum confection comprising the product of removing at least a portion of the liquid from an intermediate chewing gum confection comprising a confectionery layer comprising about 76 to about 94% by weight of a solid particulate, and about 6 to about 24% by weight of a diffusion controller sol, the diffusion controller sol comprising about 4 to about 12% by weight of a liquid, and about 2 to about 12% by weight of a diffusion controller, wherein all weight percents are based on the total weight of the confectionery layer; and an edible substrate comprising a chewing gum composition. Again, there is no particular limit on the spatial relationship of the confectionery layer and the edible substrate. In a preferred embodiment, the solid particulate comprises maltitol, the diffusion controller comprises xanthan gum, and the liquid comprises water. The solid particulates can be uniformly dispersed throughout the confectionery layer. The confectionery layer can be substantially free of air bubbles. The chewing gum confection can comprise a single confectionery layer, or two or more confectionery layers having the same or different compositions.

The invention extends to methods of making the chewing gum confection. Thus, one embodiment is a method of forming a multi-region chewing gum confection comprising: a) blending about 76 to about 94% by weight of solid particulates, and about 6 to about 24% by weight of a diffusion controller sol, the diffusion controller sol comprising about 4 to about 12% by weight of a liquid, and about 2 to about 12% by weight of a diffusion controller to form a confectionery composition; wherein all weight percents are based on the total weight of the confectionery composition; b) forming the confectionery composition (i.e., a mass of the confectionery composition, or "confectionery mass") into a confectionery layer; and c) applying the confectionery layer to an edible substrate comprising a chewing gum composition. In some embodiments, steps b) and c) are conducted by coextruding the confectionery composition and the chewing gum composition. Step b) can include forming the confectionery layer on a roller and step c) comprises transferring the confectionery layer from the roller to the edible substrate. Step b) can include forming the confectionery composition into a sheet, trimming the ends of the sheet to form a trim material, and recycling the trim material for use as at least part of the confectionery composition of step b). The method can, optionally, further comprise reducing the amount of liquid in the confectionery layer, before and/or after the confectionery layer is applied to the edible substrate. Reducing the liquid amount may occur spontaneously under ambient conditions but can also be accelerated by the use of heat, pressure, and atmospheric exchange. The reduction of liquid amount is typically accompanied by an apparent hardening of the diffusion controller. The method can, optionally, further comprise comprising applying pressure to the combined confectionery layer and edible substrate, the pressure being effective to achieve one or more of shaping the chewing gum confection, removing liquid from the chewing gum confection, and increasing adhesion between the confectionery layer or region and the edible substrate. At least one of the steps a) and b) can, optionally, be conducted at about ambient temperature. In one embodiment, step b) comprises applying the confectionery composition to a roller assembly comprising a target roller, wherein the resulting confectionery layer releasably adheres to the target roller; and step c) comprises transferring the confectionery layer from the target roller to the edible substrate. For example, the roller assembly can comprise at least one pair of rotating rollers including a target roller and a secondary roller which rotate in opposite directions, the pair of rotating rollers being separated by a gap, the method further comprising placing the confectionery composition in the gap and in operative contact with both rotating rollers and compressing the confectionery composition to form a layer or region, and preferentially adhering the layer or region of the confectionery composition to the target roller (i.e., downstream of the gap and upstream of contact of the confectioner layer with the edible substrate). To aid retention of the confectionery layer on the target roller, at least one target parameter for the pair of rollers can be adjusted. Such target parameters include, for example, the size of the gap, the speed of the pair of rollers, pressure on the confectionery composition by the pair of rollers in proximity of the gap, and the viscosity of the dough-like confectionery material. In a specific embodiment, the step of transferring the confectionery composition from the target roller to the edible substrate comprises: positioning the target roller proximate to the edible substrate so that the confectionery composition is in contact with the edible substrate; and adjusting the pressure on the edible substrate by the target roller so that the confectionery composition is preferentially applied onto the surface of the edible substrate and remains in contact with the edible substrate (and detached from the target roller). The roller assembly can comprise one pair of rotating rollers, or two or more pairs of rotating rollers. The target roller can be cylindrical and have a continuous curvilinear outer surface for receiving the confectionery composition. Alternatively, the target roller can have a non-cylindrical outer surface for receiving the dough-like confectionery material. The steps of the method can, optionally, be repeated to obtain a multi-layered chewing gum confection. The method can, optionally, further comprise applying at least one layer of coating material by a conventional hard panning or soft panning technique. The coating material can be applied to at least one surface of the combined confectionery layer and edible substrate. The method can, optionally, further include drying the combined confectionery layer and edible substrate at about room temperature.

The invention extends to chewing gum confections produced by any of the various methods described above.

The invention also extends to apparatus used to form the chewing gum confection. Thus, one embodiment is an apparatus for forming a multi-region chewing gum confection comprising means for blending about 76 to about 94% by weight of a solid particulate, and about 6 to about 24% by weight of a diffusion controller sol comprising about 4 to about 12% by weight of a liquid, and about 2 to about 12% by weight of a diffusion controller to form a confectionery composition; wherein all weight percents are based on the total weight of the confectionery composition; means for forming (a mass of) the confectionery composition into a confectionery layer; and means for applying the confectionery layer to an edible substrate comprising a chewing gum composition. The apparatus can, optionally, further comprise means for reducing the amount of liquid in the combined confectionery layer and edible substrate. The apparatus can, optionally, further comprise means for maintaining the confectionery composition at ambient temperature. The apparatus can, optionally, further comprise means for maintaining the combined confectionery layer and edible substrate at ambient temperature.

In the apparatus, the means for applying the confectionery layer to an edible substrate can comprise a roller assembly comprising: a) at least one first pair of rotating rollers spaced apart by a gap into which is inserted the confectionery composition, one of the first pair of rotating rollers being a target roller for receiving a layer or region of the dough-like confectionery material; b) means for forming the confectionery composition into the layer or region as the confectionery composition travels through the gap; c) means for preferentially retaining the layer or region of the dough-like confectionery material onto the target roller; and d) means for transferring the layer or region from the target roller to the edible substrate. The apparatus can, optionally, further comprise at least one compressive roller positioned downstream of the first pair of rotating rollers for applying a compressive force to the layer or region after contact with the substrate. The apparatus can, optionally, further comprise means for adjusting the compressive force on the layer or region. In particular, the compressive force can be sufficient to cause a portion (preferably a major portion) of the liquid to migrate to the surface of the layer or region.

Another embodiment is an apparatus for forming a chewing gum confection comprising: a) an extrusion assembly comprising a first extrusion means for extruding an edible substrate comprising a chewing gum composition; b) a second extrusion means for extruding a dough-like confectionery composition into a layer or region in contact with the edible substrate to form a confectionery material intermediate product; and c) means for reducing the amount of water in the confectionery material intermediate product to form the chewing gum confection.

Particular Embodiments of the Non-Chewing-Gum Confection

In the embodiments described in this section, "substrate composition" refers a confectionery composition that is not a chewing gum composition. That is, it comprises a chewing gum base amount of less than or equal to 5% by weight. In some embodiments, the chewing gum base content of the substrate composition is less than or equal to 3% by weight, specifically less than or equal to 1% by weight, based on the weight of the substrate composition. In some embodiments, the substrate composition excludes chewing gum base. Also for the embodiments described in this section, the "substrate composition" can be a composition inside or outside the scope of the composition of the "confectionery layer or region". As used herein, the term "substrate composition" are not intended to require any particular spatial orientation of the "substrate composition" and the "confectionery composition".

One embodiment is a multi-region confection comprising: a) a first region comprising a substrate composition; and b) a second region comprising a confectionery composition comprising a solid phase and a liquid phase, at least a major portion of the solid phase being surrounded by the liquid phase, the solid phase comprising a plurality of solid particulates, and the liquid phase comprising a mixture of a liquid and a diffusion controller.

It is possible to have various spatial relationships between the first region and the second region. For example, the confection can comprise a confectionery-coated hard candy core, a hard candy-coated confectionery core, a confectionery-coated soft candy core, a soft candy-coated confectionery core, a confectionery-coated chocolate core, a chocolate-coated confectionery core, a chocolate bar with confectionery coating on one major surface, a chocolate bar with confectionery coating on both major surfaces, a chocolate bar completely enveloped in confectionery coating, and a multi-layer (or "millefeuille") confection comprising multiple confectionery layers between which are sandwiched soft candy layers. The confection can comprise a single second region. Alternatively, the confection can comprise at least two second regions. While the above variations include contact between the confectionery layer or region and the edible substrate, it is also possible for the confection to have one or more intermediate layers separating the confectionery layer or region and the edible substrate. Also, there is no particular limit on the shape of the confection, with suitable shapes including sticks, tapes, pillows, cubes, cylinders, triangular prisms, rectangular prisms, bars, slabs, wavy shapes, suggestive shapes (such as mint leaves and fruit shapes, etc.), and the like.

There is no particular limit on the composition of the edible substrate except that it is not a chewing gum composition. For example, the substrate composition can comprise a hard candy composition, a soft candy composition, or a chocolate composition.

All of the variations in component types and amounts described above for the dough-like confectionery composition apply to the confectionery layer or region of the present confection, with the exception that amount the liquid (and any other volatile components) may have been reduced in the confectionery layer or region relative to the dough-like confectionery composition.

In one embodiment, the confectionery composition comprises about 50 to about 98% by weight of the solid particulate, and about 2 to about 20% by weight of the diffusion controller, wherein all percent by weight values are based on the total weight of the confectionery composition. In this embodiment, the solid particulate comprises maltitol, and the hardened diffusion controller comprises xanthan gum.

In some embodiments, the multi-region confection further comprises a third region that is the same as one of the first region or the second region. In some embodiments, the multi-region confection further comprises a third region that is different than at least one of the first region or the second region. In some embodiments, the second region at least partially surrounds the first region. In some embodiments, the second region forms an exterior surface of the multi-region confection.

One embodiment is a multi-region confection comprising: a) a first, confectionery region comprising about 76 to about 94% by weight of solid particulates, and about 6 to about 24% by weight of a diffusion controller sol, the diffusion controller sol comprising about 4 to about 12% by weight of a liquid, and about 2 to about 12% by weight of a diffusion controller, wherein all weight percents are based on the total weight of the first, confectionery region and wherein the first, confectionery region has a first moisture content before processing, a second moisture content during processing, and a third moisture content after processing; and b) a second, substrate region comprising a substrate composition. In some embodiments, the first moisture content is about 8% to about 15%, and the second moisture content is about 4% to about 6%, and the third moisture content is less than 2% wherein all weight percents are based on the total weight of the first, confectionery region. In some embodiments, the solid particulates comprise maltitol, the diffusion controller comprises xanthan gum, and the liquid comprises water. In some embodiments, the solid particulates are uniformly dispersed throughout the first, confectionery region. In some embodiments, the first, confectionery region is substantially free of air bubbles. In some embodiments, the multi-region confection comprises a single first, confectionery region.

The invention extends to methods of forming the confection. Thus, one embodiment is a method of forming a multi-region confection comprising: a) blending about 76 to about 94% by weight of a solid particulate, and about 6 to about 24% by weight of a diffusion controller sol, the diffusion controller sol comprising about 4 to about 12% by weight of a liquid, and about 2 to about 12% by weight of a diffusion controller, to form a confectionery composition; wherein all weight percents are based on the total weight of the confectionery composition; b) forming the confectionery composition (i.e., a mass of the confectionery composition, or "confectionery mass") into a confectionery layer; and c) applying the confectionery layer to an edible substrate comprising a substrate composition. Steps b) and c) can be conducted by coextruding the confectionery composition and the substrate composition. Step b) can include forming the confectionery layer on a roller and step c) comprises transferring the confectionery layer from the roller to the edible substrate. Step b) can include forming the confectionery composition into a sheet, trimming the ends of the sheet to form a trim material, and recycling at least part of the trim material for use as at least part of the confectionery composition of step b). The method can further include reducing the amount of liquid in the confectionery layer, before and/or after the confectionery layer is applied to the edible substrate. Reducing the amount of liquid is typically accompanied by an apparent hardening of the diffusion controller. The method can, optionally, further comprise applying pressure to the combined confectionery layer and edible substrate. The pressure can be applied at about the time the preliminary confectionery material is applied to the edible substrate or shortly thereafter. At least one of the steps a) and b) can, optionally, be conducted at about ambient temperature. Step b) can comprise applying the confectionery composition to a roller assembly comprising a target roller, wherein the resulting confectionery layer releasably adheres to the target roller. Step c) can comprise transferring the confectionery layer from the target roller to the edible substrate. The roller assembly can include at least one pair of rotating rollers including a target roller and a secondary roller which rotate in opposite directions, the pair of rotating rollers being separated by a gap, the method further comprising placing the confectionery composition in the gap and in operative contact with both rotating rollers and compressing the confectionery composition to form a layer or region, and preferentially adhering the layer or region of the confectionery composition to the target roller (downstream of the gap and upstream of the contact of the confectionery layer with the edible substrate). At least one target parameter of the pair of rollers can be adjusted so that the confectionery composition is preferentially retained on the target roller as it rotates prior to the time it comes into contact with the edible substrate. Such target parameters include, for example, the size of the gap, the speed of the pair of rollers, pressure on the confectionery composition by the pair of rollers in proximity of the gap, and the viscosity of the dough-like confectionery material. In some embodiments, the step of transferring the confectionery composition from the target roller to the edible substrate comprises: positioning the target roller proximate to the edible substrate so that the confectionery composition is in contact with the edible substrate; and adjusting the pressure on the edible substrate by the target roller so that the confectionery composition is preferentially applied onto the surface of the edible substrate and remains in contact with the edible substrate (and detached from the target roller). The roller assembly can include at least two pairs of rotating rollers. The target roller can be cylindrical and have a continuous curvilinear outer surface for receiving the confectionery composition. Alternatively, the target roller can have a non-cylindrical outer surface for receiving the dough-like confectionery material. The steps of the method can be repeated to obtain a multi-layered confection. The method can further include applying at least one layer of coating material by a conventional hard panning or soft panning technique to at least one surface of the combined confectionery layer and edible substrate. The method can further include drying the combined confectionery layer and edible substrate at about room temperature.

The invention extends to confections produced by any of the above-described methods.

The invention also extends to apparatus used to form the confection. Thus, one embodiment is an apparatus for forming a confection comprising: means for blending about 76 to about 94% by weight of a solid particulate, and about 6 to about 24% by weight of a diffusion controller sol, the diffusion controller sol comprising about 4 to about 12% by weight of a liquid, and about 2 to about 12% by weight of a diffusion controller to form a confectionery composition; wherein all weight percents are based on the total weight of the confectionery composition; means for forming (a mass of) the confectionery composition into a confectionery layer; and means for applying the confectionery layer to an edible substrate comprising a substrate composition. The apparatus can, optionally, further comprise means for reducing the amount of liquid in the combined confectionery layer and edible substrate. The apparatus can, optionally, further comprise means for maintaining the confectionery composition at ambient temperature. The apparatus can, optionally, further comprise means for maintaining the combined confectionery layer and edible substrate at ambient temperature. In some embodiments of the apparatus, the means for applying the confectionery layer to an edible substrate comprises a roller assembly comprising: a) at least one first pair of rotating rollers spaced apart by a gap into which is inserted the confectionery composition, one of the first pair of rotating rollers being a target roller for receiving a layer or region of the dough-like confectionery material; b) means for forming the confectionery composition into the layer or region as the confectionery composition travels through the gap; c) means for preferentially retaining the layer or region of the dough-like confectionery material onto the target roller; and d) means for transferring the layer or region from the target roller to the edible substrate. The apparatus can, optionally, further comprise at least one compressive roller positioned downstream of the first pair of rotating rollers for applying a compressive force to the layer or region after contact with the substrate, as well as means for adjusting the compressive force on the layer or region. The compressive force is preferably sufficient to cause a portion (preferably a major portion) of the liquid to migrate to the surface of the layer or region.

Another embodiment is an apparatus for forming a confection comprising: a) an extrusion assembly comprising a first extrusion means for extruding an edible substrate comprising a substrate composition; b) a second extrusion means for extruding a dough-like confectionery composition into a layer or region in contact with the edible substrate to form a confectionery material intermediate product; and c) means for reducing the amount of water in the confectionery material intermediate product to form the confection.

The invention is further illustrated by the following non-limiting examples.

EXAMPLES

Example 1

Eighteen grams of xanthan gum and 12 grams of water were mixed in a 35 milliliter Brabender mixer for 5 minutes at 80 rotations per minute (rpm). The mixture was left to hydrate for 1 hour and mixed for another 5 minutes at 80 rpm.

Fifteen grams of maltitol and 5 grams of water were mixed and heated to 80° C. The mixture was stirred until a homogeneous mixture was formed, which was then allowed to cool to room temperature to form a maltitol syrup.

Nine grams of the xanthan gum/water mixture and 6 grams of the maltitol syrup were placed in a 120 milliliter Brabender mixer and mixed with 90 grams of maltitol powder (Maltisorb P35), 0.5 grams of peppermint flavor, 0.5 grams of aspartame, 0.18 grams of acesulfame potassium, 0.09 grams of sucralose, and 0.2 grams of a colorant (yellow 5 lake). The ingredients were mixed for 5 minutes at 80 rpm to obtain a uniform cohesive dough-like confectionery material.

The dough-like confectionery material was placed between rollers of a Brabender roller mill, separated by a gap of 0.8 millimeter and rotating at 60 rpm, and extruded into a sheet having a thickness of 0.8 millimeter.

The sheet was put on the top and the bottom of a sheet of peppermint flavored gum base prepared in a way known to those skilled in the art, and rolled to a thickness of 4 millimeters. The sandwich of gum base and dough-like confectionery material was passed through a rolling and scoring machine with rollers spaced apart by 3.2 millimeters. The dough-like confectionery material was laminated on the top and the bottom of the gum and subsequently scored into pieces of slab gum measuring 43.5 millimeters in length and 12 millimeters in width with a thickness of 3.2 millimeters. After conditioning for 12 hours at room temperature of 21° C. and relative humidity of 40%, the final gum product was broken into pieces and upon chewing was found to be crunchy.

Example 2

8.4 grams of xanthan gum and 16.1 grams of water were mixed in a 35 ml Brabender mixer for 5 minutes at 80 rpm. The mixture was left to hydrate for 1 hour and mixed for another 5 minutes at 80 rpm.

10.5 grams of maltitol were added to the above mixture and mixed at 80 rpm for 15 minutes until completely dissolved.

Fifteen grams of the resulting mixture was placed in a 120 ml Brabender mixer and mixed with 90 grams of maltitol powder (Maltisorb P200), 0.5 grams of peppermint flavor 0.5 grams of aspartame, 0.18 grams of acesulfame potassium, 0.09 grams of sucralose, and 0.2 grams of yellow 5 lake. The ingredients were mixed for 5 minutes at 80 rpm until a uniform cohesive dough-like confectionery material was obtained.

The dough-like confectionery material was put between rollers of Brabender roller mill spaced at 0.8 mm and rotating at 80 rpm, and extruded into a sheet having a thickness of 0.8 millimeter. The gap between the rollers was set at 0.8 millimeter.

The resulting sheet was applied to the top and the bottom of a sheet of peppermint gum base having a thickness of 4 millimeter, prepared in a way known to those skilled in the art. The sandwich of gum base and dough-like confectionery material was passed through a rolling and scoring machine with pellet rollers, and subsequently scored into pellets measuring 16.5 millimeter in length and 13.2 millimeter in width, with a thickness of 5 millimeter. After conditioning for 12 hours at room temperature of 21° C. and relative humidity of 40%, the final gum product was broken into individual pellets. The pellets appeared similar to conventional pellets, and upon chewing were found to be crunchy.

Example 3

Pellets from Example 2 were further coated using conventional hard panning process of coating with maltitol, as known to those skilled in the art. In particular, a saturated coating solution of maltitol and water was sprayed onto the individual pellets, to add approximately 9% additional coating. The pellets had the appearance of conventional hard coated pellets, having a crunch very similar to the conventional pellets.

Example 4

Twelve grams of xanthan gum and 18 grams of water were mixed in a 35 milliliter Brabender mixer for 5 minutes at 80 rpm. The mixture was left to hydrate for 1 hour and mixed for another 5 minutes at 80 rpm.

Fifteen grams of maltitol and 5 grams of water were mixed and heated to 80° C. The mixture was stirred until a homogeneous syrup was formed. The syrup was allowed to cool.

Nine grams of the xanthan gum/water mixture, 6 grams of the maltitol syrup, and 3 grams of glycerin were placed in a 120 ml Brabender mixer and mixed with 90 grams of maltitol, 0.5 grams of peppermint flavor, 0.5 grams of aspartame, 0.18 grams of acesulfame potassium, 0.09 grams of sucralose, and 0.2 grams of yellow 5 lake. The ingredients were mixed for 5 minutes at 80 rpm or until a uniform cohesive dough-like confectionery material was obtained.

The dough-like confectionery material was placed between rollers of a Brabender roller mill and extruded into a sheet having a thickness of 0.8 millimeter. The gap between the rollers was set at 0.8 millimeter. The rollers we rotated at a rate of 60 rpm to form the sheet.

The sheet was placed on the top and bottom of a sheet of peppermint gum prepared in a way known to those skilled in the art. The gum was predrilled down to a thickness of 4 mm. The sandwich of gum and dough-like confectionery material was passed through a rolling and scoring machine with the rollers set apart by a distance of 3.2 millimeters. The dough-like confectionery material was laminated on the top and bottom of the gum and subsequently scored into pieces of slab gum measuring 43.5 millimeters in length and 12 millimeters in width, with a thickness of 3.2 millimeters. After conditioning for 12 hours at room temperature of 21° C. and relative humidity of 40%, the gum was broken into pieces and upon chewing was found to have a soft shell not exhibiting any crunchiness.

In the following examples, a variety of core materials were coated with several coating compositions. The core materials include a typical chewing gum composition, a bubble gum composition containing plasticizers for soft chew characteristics, and a fat based gum composition that has very soft chew characteristics. In addition, a soft gum core absent polyols was used alone and in combination with a candy core. The coating compositions employed ranged from a hard crunchy coating to a soft coating with and without crunchiness as well as combinations thereof wherein one side of the core is coated with one type of coating composition and the other side with a different type of coating composition.

In addition, the presence of gelatin (plasticizer) in a coating composition caused a roughened surface texture that was not present when gelatin was removed as a plasticizer. For a soft coating with no crunch, it was desirable to use a non-crystallizing maltitol syrup (e.g., the maltitol syrups available from Roquette as LYCASIN 85/55, LYCASIN HBC, and LYCASIN 75/75) and/or glycerin as the plasticizer. For crunch type coatings, maltitol syrup or other polyol syrup was desirably added to the coating. For crunch hard coatings comparable to hard panned coatings, plasticizers were omitted from the coating composition.

As previously indicated, the confectionery products may have soft to hard layers with non-crunch to crunch characteristics. It is desirable, as previously discussed, and an option to provide sensory cues (e.g. certain colors and/or flavors) to "cue" the consumer as to the type of coating on the product.

Example 5

A gum composition having a core (gum base composition) containing the ingredients shown in Table 1 is prepared as follows.

TABLE 1

Regular Gum Core

| Gum (Core) | Percent |
| --- | --- |
| Gum Base | 30% |
| Plasticizer | 5.5% |
| Acetylated | 0.5% |
| Polyol | 54% |
| Flavor | 4.0% |
| Cooling Compound | 0.1% |
| Acid | 1.5% |
| Colorant | 0.4% |
| High Intensity | 4.0% |
| Total | 100% |

A mixing vessel is heated to 90° C. Gum base is added to the vessel until molten. Plasticizer and acetylated monoglycerides are added to the molten gum base under stirring. The remaining ingredients are added sequentially. The gum composition is then transferred to an extruder where it is discharged as a flat sheet.

A dough-like confectionery material for producing a soft coating with a low degree of crunch is prepared in a manner similar to Examples 1-4 by mixing the ingredients listed in Table 2.

TABLE 2

Coating-Soft-Low Degree of Crunch

| Gum (Core) Components | Percent |
| --- | --- |
| Xanthan Gum Premix (3.0% xanthan gum 4.5%, water) | 7.5% |
| Gelatin Premix (3.0% gelatin 3.0% water) | 6.0% |
| Maltitol Syrup Premix (4.5% maltitol 2.0% water) | 6.5% |

TABLE 2-continued

Coating-Soft-Low Degree of Crunch

| Gum (Core) Components | Percent |
| --- | --- |
| Plasticizer | 4% |
| Polyol | 72% |
| Acid | 1.4% |
| Colorant | 1.0% |
| High Intensity Sweetener | 0.3% |
| Flavor | 0.3% |
| Water | 1.0% |
| Total | 100% |

The dough-like confectionery material is placed between rollers of a Brabender roller mill and extruded into a sheet having a thickness equivalent to 25% by weight based on the weight of the chewing gum composition. The gap between the rollers is set at 0.8 millimeter. The rollers are rotated at a rate of 60 rpm to form the sheet.

The sheet is placed on the top and bottom of the extruded gum composition and laminated thereon by applying pressure to the coated gum to compress the coated gum to a thickness of 4 mm. The sandwich of gum and dough-like confectionery material is passed through a rolling and scoring machine with the rollers set apart by a distance of 3.2 millimeter. The thus coated gum is subsequently scored into pieces of slab gum measuring 43.5 millimeter in length and 12 millimeter in width, with a thickness of 3.2 millimeter. After conditioning for 12 hours at room temperature of 21° C. and relatively humidity of 40%, the gum is broken into pieces and upon chewing is found to have a soft shell, and exhibits a low degree of crunchiness.

Examples 6-8

The process of Example 5 is repeated except that the coated dough-like confectionery material is scored into block shaped pieces, pellets and sticks, respectively. The pieces of chewing gum are found to have a soft shell and exhibit a low degree of crunchiness.

Examples 9-12

The process of Examples 5-8 is repeated except that the amount of the dough-like material is increased to provide a coating thickness equivalent to 40% by weight based on the total weight of the chewing gum composition. The pieces of chewing gum are found to have a soft shell and exhibit a low degree of crunchiness.

Examples 13-20

The process of Examples 5-12 is repeated except that a dough-like confectionery material as shown in Table 3 is used for forming a soft coating with no crunch and a smooth texture.

TABLE 3

Coating-Soft-No Crunch-Smooth Surface

| Gum (Core) Components | Percent |
| --- | --- |
| Xanthan Gum Premix (3.7% xanthan gum 5.6%, water) | 9.3% |
| Plasticizer | 10% |
| Polyol | 76% |

TABLE 3-continued

Coating-Soft-No Crunch-Smooth Surface

| Gum (Core) Components | Percent |
|---|---|
| Acid | 1.7% |
| Colorant | 1.2% |
| High Intensity Sweetener | 0.4% |
| Flavor | 0.4% |
| Water | 1.0% |
| Total | 100% |

The xanthan gum premix is combined with the particulate polyol under stirring. The remaining ingredients are then added sequentially. The dough-like confectionery material is then applied to the gum composition as previously described.

The thus produced gum pieces are soft upon chewing and exhibit no crunchiness. The texture of the coating is smooth.

Examples 21-28

The process of Examples 5-12 is repeated except that the coating composition is that shown in Table 4. The coating is soft with a roughened surface and does not exhibit any crunchiness.

TABLE 4

Coating-Soft-No Crunch-Rough Surface

| Gum (Core) Components | Percent |
|---|---|
| Xanthan Gum Premix (3.7% xanthan gum, 5.6% water) | 9.3% |
| Gelatin Premix (3.0% gelatin 3.0% water) | 6.0% |
| Plasticizer | 11% |
| Polyol | 70% |
| Acid | 1.2% |
| Colorant | 1.0% |
| High Intensity Sweetener | 0.2% |
| Flavor | 0.3% |
| Water | 1.0% |
| Total | 100% |

Examples 29-36

The process of Examples 5-12 is repeated except that the coating composition is that shown in Table 5. The coating is hard and exhibits a high degree of crunchiness, comparable to a hard panned coating.

TABLE 5

Coating Hard-Crunch

| Gum (Core) Components | Percent |
|---|---|
| Xanthan Gum Premix (3.7% xanthan gum 5.6% water) | 9.3% |
| Maltitol Syrup (6.2% maltitol 2.7% water) | 8.9% |
| Polyol | 76% |
| Acid | 1.5% |
| Colorant | 0.7% |
| High Intensity Sweetener | 0.3% |
| Flavor | 0.3% |
| Water | 3.0% |
| Total | 100% |

Examples 37-68

The process of Examples 5-36 is repeated except that the core is coated on one side with a coating composition of Table 2, while the opposite side of the core is coated with a coating composition of Table 3.

Examples 69-100

The process of Examples 5-36 is repeated except that the core is coated on one side with a coating composition of Table 4 and the opposite side is coated with a coating composition of Table 5.

Examples 101-132

The process of Examples 5-36 is repeated except that a core gum composition having the composition shown in Table 6 is employed.

TABLE 6

Bubble Gum Core

| Gum (Core) | Percent |
|---|---|
| Gum Base | 30% |
| Plasticizer | 14% |
| Polyol | 46% |
| Flavor | 4.0% |
| Cooling Compound | 0.1% |
| Colorant | 0.6% |
| Acid | 1.5% |
| High Intensity | 3.8% |
| Total | 100% |

The coatings for the thus produced gum pieces exhibit the same softness/hardness/crunchiness sensations as that described above for Examples 5-36.

Examples 133-164

The process of Examples 5-36 is repeated except that a core gum composition having the composition shown in Table 7 is employed.

TABLE 7

Fat Based Gum Core

| Gum (Core) | Percent |
|---|---|
| Gum Base | 51% |
| Hydrogenated Fat | 15% |
| Polyol | 19% |
| Flavorant | 6.0% |
| Cooling Compound | 0.1% |
| Acid | 1.5% |
| Colorant | 2.4% |
| High Intensity | 5.0% |
| Total | 100% |

The coatings for thus produced gum pieces exhibit the same softness/hardness/crunchiness sensations as described above for Examples 5-36.

Examples 165-196

A candy composition for use as a core material is prepared from the ingredients shown in Table 8.

TABLE 8

Candy Core

| Candy (Core) Components | Percent |
|---|---|
| Hydrogenated Starch Hydrolysate | 35% |
| Maltitol Syrup (Maltitol 13.3% Water 5.7%) | 19% |
| Hydrogenated Fat | 2.0% |
| Polyol | 43% |
| High Intensity Sweetener | 0.4% |
| Flavor | 0.6% |
| Total | 100% |

A standard mixer is warmed to 70° C. Hydrogenated starch hydrolysate, (preferably in powder form or preferably polyglucitol), hydrogenated fat and the maltitol syrup are added to the mixer and stirred for 3-5 minutes. The polyol is then added over the course of 10 minutes under stirring. The mixture is maintained at the warming temperature until a homogeneous mass is formed. The mass is allowed to cool to room temperature followed by the addition of the high intensity sweetener and flavor.

The candy composition is then coated in the same manner as described above in connection with Examples 5-36 to form coated candy products where the coatings exhibit the same softness/hardness/crunch sensations described for Examples 5-36.

Examples 197-238

A gum core exhibiting soft chew characteristics throughout the chewing cycle is used to prepare gum products. The composition of the gum core is shown in Table 9. The gum core is coated with the coating compositions disclosed in Tables 2-5, respectively.

TABLE 9

Soft Gum Core

| Gum (Core) | Percent |
|---|---|
| Gum Base | 71% |
| Talc | 15% |
| Plasticizer | 1.0% |
| Flavor | 9.0% |
| Cooling Compound | 0.1% |
| Colorant | 0.9% |
| High Intensity | 3.0% |
| Total | 100% |

The gum core is prepared in accordance with the following procedure. A mixer is warmed to 90° C. The gum base is added to the mixer under stirring until the gum base is liquefied. The mixer is allowed to gradually cool to 40° C. while adding the plasticizer, talc, cooling compound and colorant. When the mixer reaches 40° C., the flavor is added under stirring followed by the addition of the high intensity sweetener. After coating, the resulting gum products exhibit the same softness/hardness/crunchiness sensations described above in connection with Examples 5-36.

Examples 229-260

A core comprised of a homogeneous mixture of 50% by weight of candy shown in Table 8 and the soft gum core material shown in Table 9 (see Table 10) is used to form gum/candy products with the coatings shown in Tables 2-5, respectively.

TABLE 10

Candy/Soft Gum Core

| Gum (Core) | Percent |
|---|---|
| Candy (Table 8) | 50% |
| Soft Gum (Table 9) | 50% |
| Total | 100% |

After coating, the resulting gum/candy products exhibited the same softness/hardness/crunchiness sensations described above in connection with Examples 5-36.

Examples 261-264

Five coating compositions were prepared and tested for cohesion, adhesion, and viscosity. The compositions are detailed in Table 11, where component quantities are expressed in weight percent based on the total composition. The maltitol was obtained as Roquette MALTISORB P200 with an average particle size of about 200 micrometers.

Values of average cohesive force, expressed in units of grams/centimeter$^2$ (g/cm$^2$), were measured at 23° C. according to the following procedure. The dough is placed into cylindrical sample holders with diameter of 15 millimeters. The sample holders are mounted on a Texture analyzer (TA-XT2i, Texture Technologies Corp., Scarsdale, N.Y.) and pulled apart until the dough is torn apart. The rate of the sample holder movement is 1 millimeter/second. The maximum force required for tearing the sample is recorded, calculated, and reported in units of grams per square centimeter.

Values of average adhesive force, expressed in units of grams/centimeter$^2$ (g/cm$^2$), were measured at 23° C. according to the following procedure. A cube of dough with a side of 20 millimeters is placed on a flat table attached to the Texture analyzer. A cylindrical probe with diameter of 7 millimeters is attached to the moving arm of the apparatus. The probe moves down at rate of 2 millimeters/second until it reaches a level 1 millimeter above the surface of the table. The maximum force recorded is reported in grams per square centimeter as compressive force required to form a film. The probe stays at 1 millimeter for 10 seconds to relax the material and lifts up at a rate of 2 millimeters/second. The force required to dislodge the probe form the dough is reported as adhesiveness of the dough in units of grams per square centimeter.

Rheological parameters G' and G", each expressed in units of kilopascals (kPa), and Tan Delta, and viscosity values, expressed in units of pascal-seconds (Pa·s), were measured at 23° C. according to the following procedure. A sample of dough (about 5 grams) is placed in the sample holder (biconical die with a gap of 0.487 millimeter) of Rubber Process Analyzer (RPA 2000, ALPHA Technologies, Akron, Ohio) and its rheological properties are measured in an oscillation mode. The rate of oscillation is varied from 10 to 1000 cycles per minute and the angle of oscillation is fixed at 13.95%. Parameter characterizing the dough such as complex viscosity, shear rate, elastic modulus (G'), loss modulus (G") and tan delta are reported. Complex viscosity is a frequency-dependent viscosity function determined during forced harmonic oscillation of shear stress. It is related to the complex shear modulus and represents the angle between the viscous stress and the shear stress. Shear rate for a fluid flowing between two fixed parallel plates is defined as the velocity of plate movement divided by the distance between the plates. The elastic modulus G' is a measurement of energy stored during deformation and related to the solid-like or elastic portion of the elastomer. The loss modulus G'' is a measurement of energy lost (usually lost as heat) during deformation and related to the liquid-like or viscous portion of the elastomer. Tan delta is indicative of the material's ability to dissipate energy, where tan delta=G''/G'. Flow behavior index (n) also given by the exponent in the Ostwald relationship: shear stress is proportional to the shear strain rate to the power n (that is, shear stress=$k\gamma^n$). A value for n of unity indicates Newtonian behavior, increasingly pseudoplastic non-Newtonian behavior results in a lowering in this behavior index towards zero (for example, 0.25% xanthan solution has n=0.4). The non-Newtonian behavior of the diffusion controller is important. The lower viscosity of the diffusion controller at high shear rate allows for the solids to be mixed in. The high viscosity at the low shear rates at rest help maintain the integrity of the material.

TABLE 11

|  | Ex. 261 | Ex. 262 | Ex. 263 | Ex. 264 | Ex. 265 |
|---|---|---|---|---|---|
| COMPOSITIONS |  |  |  |  |  |
| Xanthan gum | 0.5 | 1.0 | 1.5 | 20 | 25 |
| Water | 10 | 10 | 10 | 20 | 25 |
| Maltitol | 89.5 | 89.0 | 88.5 | 60 | 50 |
| PROPERTIES |  |  |  |  |  |
| Average cohesive force (g/cm$^2$) | 5339 | 4397 | 5011 | 4632 | 4006 |
| Average adhesive force (g/cm$^2$) | 404 | 333 | 522 | 1674 | 1247 |
| G' (kPa) | 758.99 | 137.9 | 14.2 | 34.5 | 25.2 |
| G'' (kPa) | 710.78 | 126.1 | 8.6 | 17.5 | 10.9 |
| Viscosity (Pa · s) | 165545 | 29740 | 2639 | 6161 | 4362 |
| Tan Delta | 0.941 | 0.910 | 0.61 | 0.51 | 0.43 |

Examples 265-280

Aqueous sols of four diffusion controllers at 20, 30, 40, and 50 weight percent were prepared, and their rheological properties were tested.

For each sol, viscosity parameters were determined as described above, and the results are presented in Table 12. The results demonstrate the pseudoplasticity of the diffusion controller sols.

TABLE 12

|  | Ex. 265 | Ex. 266 | Ex. 267 | Ex. 268 |
|---|---|---|---|---|
| COMPOSITIONS |  |  |  |  |
| Xanthan gum | 20 | 30 | 40 | 50 |
| Water | 80 | 70 | 60 | 50 |
| PROPERTIES shear rate = 0.15 sec$^{-1}$ |  |  |  |  |
| G' (kPa) | 1.24 | 2.60 | 17.53 | 43.53 |
| G'' (kPa) | 0.076 | 0.172 | 5.143 | 16.432 |
| Viscosity (Pa · s) | 1191.9 | 2489.5 | 17447.5 | 44428.0 |
| Tan Delta | 0.072 | 0.066 | 0.293 | 0.378 |
| shear rate = 1.46 sec$^{-1}$ |  |  |  |  |
| G' (kPa) | 1.11 | 2.62 | 20.72 | 53.10 |
| G'' (kPa) | 0.536 | 0.631 | 6.682 | 21.345 |
| Viscosity (Pa · s) | 117.7 | 257.4 | 2078.8 | 5464.5 |
| Tan Delta | 0.478 | 0.241 | 0.322 | 0.402 |

TABLE 12-continued

| shear rate = 14.61 sec$^{-1}$ |  |  |  |  |
|---|---|---|---|---|
| G' (kPa) | 1.57 | 3.12 | 24.60 | 63.54 |
| G'' (kPa) | 0.785 | 1.090 | 9.162 | 27.771 |
| Viscosity (Pa · s) | 16.8 | 31.5 | 250.6 | 662.2 |
| Tan Delta | 0.500 | 0.352 | 0.373 | 0.437 |

|  | Ex. 269 | Ex. 270 | Ex. 271 | Ex. 272 |
|---|---|---|---|---|
| COMPOSITIONS |  |  |  |  |
| Guar gum | 20 | 30 | 40 | 50 |
| Water | 80 | 70 | 60 | 50 |
| PROPERTIES shear rate = 0.15 sec$^{-1}$ |  |  |  |  |
| G' (kPa) | 21.18 | 79.22 | 193.98 | 314.90 |
| G'' (kPa) | 7.735 | 15.263 | 26.203 | 32.056 |
| Viscosity (Pa · s) | 21527.0 | 77042.0 | 186920.0 | 302260.0 |
| Tan Delta | 0.365 | 0.193 | 0.135 | 0.102 |
| shear rate = 1.46 sec$^{-1}$ |  |  |  |  |
| G' (kPa) | 27.66 | 91.19 | 215.55 | 342.36 |
| G'' (kPa) | 9.793 | 14.651 | 24.635 | 32.285 |
| Viscosity (Pa · s) | 2801.7 | 8820.1 | 20718.0 | 32838.0 |
| Tan Delta | 0.354 | 0.161 | 0.114 | 0.094 |
| shear rate = 14.61 sec$^{-1}$ |  |  |  |  |
| G' (kPa) | 37.76 | 101.89 | 235.87 | 365.81 |
| G'' (kPa) | 7.122 | 9.343 | 16.733 | 23.793 |
| Viscosity (Pa · s) | 366.9 | 977.1 | 2258.1 | 3500.6 |
| Tan Delta | 0.189 | 0.092 | 0.071 | 0.065 |

|  | Ex. 273 | Ex. 274 | Ex. 275 | Ex. 276 |
|---|---|---|---|---|
| COMPOSITIONS |  |  |  |  |
| Hydroxypropyl methylcellulose | 20 | 30 | 40 | 50 |
| Water | 80 | 70 | 60 | 50 |
| PROPERTIES shear rate = 0.15 sec$^{-1}$ |  |  |  |  |
| G' (kPa) | 25.27 | 44.69 | 64.69 | 78.99 |
| G'' (kPa) | 7.390 | 14.321 | 25.706 | 27.121 |
| Viscosity (Pa · s) | 25144.0 | 44809.0 | 66468.0 | 79754.0 |
| Tan Delta | 0.292 | 0.320 | 0.397 | 0.343 |
| shear rate = 1.46 sec$^{-1}$ |  |  |  |  |
| G' (kPa) | 34.05 | 57.57 | 88.29 | 106.65 |
| G'' (kPa) | 5.967 | 13.925 | 22.607 | 25.438 |
| Viscosity (Pa · s) | 3300.6 | 5656.0 | 8702.8 | 10470.0 |
| Tan Delta | 0.175 | 0.242 | 0.256 | 0.239 |
| shear rate = 14.61 sec$^{-1}$ |  |  |  |  |
| G' (kPa) | 39.67 | 68.80 | 110.17 | 135.49 |
| G'' (kPa) | 4.361 | 8.569 | 15.148 | 23.908 |
| Viscosity (Pa · s) | 381.1 | 662.1 | 1061.9 | 1313.8 |
| Tan Delta | 0.110 | 0.125 | 0.138 | 0.176 |

|  | Ex. 277 | Ex. 278 | Ex. 279 | Ex. 280 |
|---|---|---|---|---|
| COMPOSITIONS |  |  |  |  |
| Sodium carboxy-methylcellulose | 20 | 30 | 40 | 50 |
| Water | 80 | 70 | 60 | 50 |
| PROPERTIES shear rate = 0.15 sec$^{-1}$ |  |  |  |  |
| G' (kPa) | 26.31 | 36.87 | 58.49 | 136.77 |
| G'' (kPa) | 6.816 | 11.028 | 18.208 | 38.367 |
| Viscosity (Pa · s) | 25950.0 | 36753.0 | 58496.0 | 135650.0 |
| Tan Delta | 0.259 | 0.299 | 0.311 | 0.281 |
| shear rate = 1.46 sec$^{-1}$ |  |  |  |  |
| G' (kPa) | 27.27 | 42.84 | 76.08 | 183.46 |
| G'' (kPa) | 8.722 | 18.170 | 29.340 | 50.761 |
| Viscosity (Pa · s) | 2734.4 | 4443.9 | 7787.0 | 18177.0 |
| Tan Delta | 0.320 | 0.424 | 0.386 | 0.277 |

TABLE 12-continued

| | shear rate = 14.61 sec$^{-1}$ | | | |
|---|---|---|---|---|
| G' (kPa) | 38.71 | 66.89 | 113.99 | 243.95 |
| G" (kPa) | 9.879 | 18.724 | 27.187 | 40.473 |
| Viscosity (Pa · s) | 381.5 | 663.3 | 1119.1 | 2361.4 |
| Tan Delta | 0.255 | 0.280 | 0.238 | 0.166 |

Examples 281-284

These examples illustrate the use of the confectionery composition to form the hard layers in a multilayer, mille-feuille-type confection.

Example 281 uses coffee-flavored hard layers in combination with caramel-flavored soft candy layers. The confection consisted of three hard layers, each having dimensions of approximately 2 centimeters by 1.5 centimeters by 2 millimeters, between which are sandwiched two layers of soft candy, each having dimensions of about 2 centimeters by 1.5 centimeters by 2-4 millimeters.

An illustrative composition for the hard layers is given in Table 13.

TABLE 13

| Component | Amount (parts by weight) |
|---|---|
| Sucrose powder | 55.00 |
| Corn Syrup | 5.00 |
| Xanthan gum | 0.50 |
| Water | 3.00 |
| Coffee flavoring | 2.20 |
| Milk flavoring | 0.10 |
| Black pigment | 0.30 |
| Natural brown color | 1.00 |

An illustrative composition for the soft layers is given in Table 14.

TABLE 14

| Component | Amount (parts by weight) |
|---|---|
| Sucrose, granulated | 39.70 |
| Trehalose | 10.00 |
| Corn Syrup | 99.50 |
| Water | 16.60 |
| Edible oil, melting point 42° C. | 16.70 |
| DK creamer E-80 | 1.50 |
| Gelatin | 7.50 |
| Sucrose powder | 4.50 |
| Caramel flavor | 1.50 |
| Butter flavor | 0.25 |
| Milk flavor | 0.30 |
| Natural brown color | 0.50 |

The hard layer composition was prepared and formed into a layer of about 2 millimeter thickness. Rectangles of about 1.5 centimeters by 2 centimeters were cut from the layer and conditioned at 60° C. for one day. The soft layer composition was prepared, held at ambient temperature for one day, then formed into a layer of about 2 to 4 millimeter thickness. The resulting soft candy layer was cooled to 5° C. then cut into rectangles of about 1.5 centimeters by 2 centimeters. The confection was assembled by piling, from the bottom up, one rectangle of hard confection, one rectangle of soft confection, a second layer of hard confection, a second layer of soft confection, and a third layer of hard confection. The confection was packaged in an aluminum foil bag.

For Example 282, a similar procedure was followed, except that the hard layer was strawberry-flavored and the soft layer was milk-flavored. For Example 283, the hard layer was chocolate flavored and the soft layer was cheese flavored. For Example 284, the hard layer and soft layer were both mint flavored.

Example 285

This example describes a procedure for the preparation of a 25% by weight diffusion controller (e.g., xanthan gum) sol in water using a sigma blade kettle. In a 200 liter sigma blade kettle, 120 liters of water and 12 kilograms of hydrocolloid are added and mixed for 20 minutes with a blade rotation rate of 50 rotations per minute (rpm). The sol is visually inspected for lumps. If there are lumps mixing is continued until the lumps are broken. There should be no lumps with size bigger than 1 millimeter. When the lumps are broken, additional hydrocolloid is added slowly (e.g., at 1 kilogram/minute) to the kettle while stirring is continued at 50 rpm. Caution is taken to evenly sprinkle the hydrocolloid over the surface of the gum in order to avoid the formation of large lumps. If the hydrocolloid is added too quickly, large lumps can be formed. The approximate time for addition is approximately 30 minutes. When the additional hydrocolloid (28 kg) is added mixing is continued at 50 rpm for 30 minutes. The sol is inspected visually. If there are lumps, additional mixing is conducted until the lumps are broken. If there are no lumps, the sol is discharged. In the foregoing procedure, the batch is mixed at room temperature. Optionally the sol can be mixed at elevated temperature up to about 90° C. If optional osmotic pressure controller is needed for the formula it can be added to the mixer and dissolved. Osmotic pressure controller can be dissolved separately before addition to the kettle. The hydrocolloid sol can be stored at temperature of 4° C. for at least 15 days without adverse effects.

Example 286

This example describes a procedure for the preparation of a 25% by weight diffusion controller sol in water using a twin-screw extruder. Hydrocolloid (e.g., xanthan gum) is fed at rate of 2 pounds/hour (0.907 kilogram/hour) by a powder feeder to the first barrel of a 40 millimeter internal diameter twin-screw extruder. The screws are turning at rate of 200 rpm. Water is injected in the second barrel section at rate of 6 lbs/hr.

The screw configuration of the extruder is summarized in Table 15. The temperature of all barrels is set to 50° C. The discharged material is collected and used for the preparation of dough-like confection. Although this example utilizes a twin-screw extruder, single-screw extruders and other high-shear mixing devices can also be used.

TABLE 15

| Barrel No. | Type of Screw Elements |
|---|---|
| 1 | conveying |
| 2 | mixing |
| 3 | conveying |
| 4 | mixing |
| 5 | conveying |
| 6 | reversed |
| 7 | conveying |
| 8 | mixing |
| 9 | conveying |

Example 287

This example describes the preparation of a dough-like confectionery composition in a twin-screw extruder. Hydrocolloid is fed into first barrel at rate of 1.65 pounds/hour (0.748 kilogram/hour). Water is injected into second barrel at rate of 4.44 pounds/hour (2.014 kilograms/hour). Gum flavor is injected into barrel #3 at a rate of 0.24 pounds/hour (0.109 kilogram/hour). Maltitol syrup (75% solids) is fed into barrel #4 at rate of 7.7 pounds/hour (3.493 kilograms/hour). The powder ingredients are fed via a twin screw side feeder connected to barrel #7 at the following rates:

| | |
|---|---|
| Maltitol P35 | 31.60 pounds/hour (14.33 kilogram/hour) |
| Yellow #5 Lake color | 0.10 pounds/hour (0.454 kilogram/hour) |
| Aspartame | 0.24 pounds/hour (0.11 kilogram/hour) |
| Ace-K | 0.08 pounds/hour (0.036 kilogram/hour) |
| Sucralose | 0.04 pounds/hour (0.018 kilogram/hour) |

The temperature of all barrels is set at 40° C. The dough is collected and used to make confectionery products This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A non-chewing gum confectionery composition comprising
   a solid phase and a liquid phase, at least a major portion of the solid phase being surrounded by the liquid phase,
   the solid phase comprising a solid particulate in an amount of about 76 to 95% by weight of the confectionery composition, wherein the solid particulate is selected from sugars and sugar alcohols, and
   the liquid phase comprising a mixture of a liquid and a diffusion controller,
   wherein the liquid is present in an amount of about 2% to about 16% by weight of the confectionery composition, and
   the diffusion controller is present in an amount of about 2 to about 10% by weight of the confectionery composition,
   wherein the liquid is water, with the proviso that the liquid phase excludes hydrogenated starch hydrolysates and glycerin; and
   the diffusion controller is selected from the group consisting of xanthan gum, carboxymethyl cellulose, methyl cellulose, hydroxypropylmethyl cellulose, starch, modified starches, inulin, konjac, chitosan, tragacanth, karaya, ghatti, larch, carageenan, alginate, chemically modified alginate, agar, guar, locust bean, *psyllium*, tara, gellan, curdlan, pullan, gum arabic, gelatin, and pectin, as well as mixtures thereof, and
   wherein the non-chewing gum confectionery composition excludes chewing gum base.

2. The non-chewing gum confectionery composition of claim 1, wherein the solid particulate has an average particle size of about 1 to about 500 micrometers.

3. The non-chewing gum confectionery composition of claim 1, wherein the solid particulate is a sugar alcohol having a water solubility of about 140 to about 200 grams per 100 grams water at 25° C.

4. The non-chewing gum confectionery composition of claim 1, wherein water is present in an amount of about 4 to about 12% by weight, based on the weight of the non-chewing gum confectionery composition.

5. The non-chewing gum confectionery composition of claim 1, wherein the diffusion controller is selected from the group consisting of xanthan gum, carboxymethyl cellulose, alginate, gum arabic, and combinations thereof.

6. The non-chewing gum confectionery composition of claim 5, wherein the diffusion controller comprises xanthan gum.

7. The non-chewing gum confectionery composition of claim 1, wherein the diffusion controller comprises carboxymethyl cellulose.

8. The non-chewing gum confectionery composition of claim 1, wherein the diffusion controller comprises gum arabic.

9. The non-chewing gum confectionery composition of claim 1, wherein the diffusion controller has a molecular weight of at least about 50,000 daltons.

10. The non-chewing gum confectionery composition of claim 1, wherein the diffusion controller is present in an amount of about 20% to about 55% by weight, based on the weight of the liquid phase.

11. The non-chewing gum confectionery composition of claim 1, further comprising an osmotic pressure controller wherein the osmotic pressure controller is soluble in water and selected from the group consisting of carbohydrates having a molecular weight of less than about 2,000 and dextrans.

12. The non-chewing gum confectionery composition of claim 1, further comprising an osmotic pressure controller wherein the osmotic pressure controller is a sugar alcohol.

13. The non-chewing gum confectionery composition of claim 1, further comprising an osmotic pressure controller, wherein the osmotic pressure controller comprises dissolved maltitol.

14. The non-chewing gum confectionery composition of claim 1, wherein the diffusion controller is xanthan gum.

15. The non-chewing gum confectionery composition of claim 1, wherein the water is present in an amount of about 7 to about 11% by weight, based on the weight of the non-chewing gum confectionery composition.

16. The non-chewing gum confectionery composition of claim 1, wherein the diffusion controller is present in an amount of about 3 to 5% by weight based on the weight of the non-chewing gum confectionery composition.

17. The non-chewing gum confectionery composition of claim 14, wherein the xanthan gum is present in an amount of about 20% to about 55% by weight based on the weight of the liquid phase.

18. The non-chewing gum confectionery composition of claim 14, wherein the weight ratio of the liquid phase to the solid phase is about 0.1:1 to about 0.15:1.

19. The non-chewing gum confectionery composition of claim 1, wherein the liquid phase comprises water in an amount of about 4 to about 12% by weight and the diffusion controller in an amount of about 2 to about 10% by weight, and further comprises an osmotic pressure controller comprising dissolved maltitol in an amount of about 1 to about 25% by weight.

20. The non-chewing gum confectionery composition of claim 1, wherein the solid phase further comprises an intense sweetener.

21. The non-chewing gum confectionery composition of claim 1, wherein the weight ratio of the liquid phase to the solid phase is about 0.1:1 to about 0.15:1.

22. The non-chewing gum confectionery composition of claim 1, wherein the non-chewing gum confectionery composition is pseudoplastic.

23. The non-chewing gum confectionery composition of claim 1, wherein the non-chewing gum confectionery composition exhibits a Tan Delta value of less than about 1.5.

24. The non-chewing gum confectionery composition of claim 23, wherein the Tan Delta value is about 0.2 to about 0.8.

25. The non-chewing gum confectionery composition of claim 1, wherein the flow behavior index (n) is about 0.65 to about 0.85.

26. The non-chewing gum confectionery composition of claim 1, which is free of gelatin.

27. The non-chewing gum confectionery composition of claim 1, which is free of polyol syrup.

* * * * *